US006232981B1

(12) United States Patent
Gossett

(10) Patent No.: US 6,232,981 B1
(45) Date of Patent: May 15, 2001

(54) METHOD FOR IMPROVING TEXTURE LOCALITY FOR PIXEL QUADS BY DIAGONAL LEVEL-OF-DETAIL CALCULATION

(75) Inventor: Carroll Philip Gossett, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/048,098

(22) Filed: Mar. 26, 1998

(51) Int. Cl.$^7$ ............................................. G06T 17/00

(52) U.S. Cl. .................................................... 345/430

(58) Field of Search ................................. 345/429, 430, 345/418, 419, 425

(56) References Cited

U.S. PATENT DOCUMENTS

| | | | | |
|---|---|---|---|---|
| 5,943,058 | * | 8/1999 | Nagy | 345/430 |
| 5,945,997 | * | 8/1999 | Zhao et al. | 345/430 |
| 5,953,015 | * | 9/1999 | Choi | 345/430 |
| 5,987,567 | * | 11/1999 | Rivard et al. | 345/430 |

OTHER PUBLICATIONS

Open GL Reference Manual, The Official Reference Document for Open GL, Release 1 by the Open GL Architecture Review Board, Addison–Wesley Publishing Company, 1992, Table of Contents (pp. vii–ix), pp. 1–26, and diagram entitled "The OpenGL Machine".

Open GL Programming Guide, Jackie Neider, Tom Davis and Mason Woo, Addison–Wesley Publishing Company, 1993, Table of Contents (pp. xv–xxiii), pp. 259–290, 412–415, and 491–504.

Principles of Interactive Computer Graphics, Second Edition, William M. Newman and Robert F. Sproull, McGraw–Hill Book Company, 1979, Table of Contents (pp. vii–xii), pp. 3–8, and 406–408.

U.S. application No. 8,956,537, Gossett et al., filed Oct. 1997.

U.S. application No. 9,048,024, Gossett, filed Mar. 1998.

U.S. application No. 9,048,099, Gossett et al., filed Mar. 1998.

The OpenGL Graphics System: A Specification (Version 1.1), Mark Segal, Kurt Akeley; Editor: Chris Frazier, Table of Contents (pp. i–iv), pp. 9–11, 67, 68, and 85–105; unpublished; dated Mar. 4, 1997; Silicon Graphics, Inc.

Computer Graphics, Principles and Practice, Second Edition in C, James D. Foley, Andries van Dam, Steven K. Feiner, and John F. Hughes, Addison–Wesley Publishing Company, Jul. 1997, Table of Contents (pp. xvii–xxiii), pp. 38–40, 67–227 (including plates 1.1–1.34), 229–283, 471–531, 611, 614, 616–647 (including plates II.1–II.39), 741–745, 800, 805–853 (including plates III.1–III.28), 855–922, 923–1006, 1015–1018, and 1083–1112.

Open GL Programming Guide, Second Edition, The Official Guide to Learning Open GL, Version 1.1, Mason Woo, Jackie Neider, and Tom Davis, Addison–Wesley Developers Press, Jul. 1997, Table of Contents (pp. v–xv), pp. 1–14, 317–373, 529–553 and 609–627.

* cited by examiner

*Primary Examiner*—Cliff N. Vo
(74) *Attorney, Agent, or Firm*—Staas & Halsey LLP

(57) ABSTRACT

In a computer graphics system, a level of detail value is determined by calculating the maximum absolute difference between values of s and t coordinates of pixels diagonally adjacent to each other within a quad of pixels. In particular, the texels needed for the quad of pixels for each of two integer levels of detail surrounding the calculated diagonal level of detail are virtually guaranteed to be within a 4×4 footprint of texels projected into a texture memory. In addition, the texture value is determined by interpolating between 2 integer levels of detail without aliasing.

36 Claims, 11 Drawing Sheets

METHOD FOR IMPROVING TEXTURE LOCALITY FOR PIXEL QUADS BY DIAGONAL LEVEL-OF-DETAIL CALCULATION

CROSS-REFERENCE TO RELATED APPLICATIONS

This application is related to U.S. patent application Ser. No. 09/048,099, entitled A Method for Efficient Handling of Texture Cache Misses by Recirculation by Carroll Philip Gossett, Mark Goudy, and Ole Bentz, filed concurrently herewith and which is incorporated herein by reference; U.S. patent application Ser. No. 09/048,048, entitled A Method for Accelerating Minified Texture Cache Access, by Carroll Philip Gossett, filed concurrently herewith and which is incorporated herein by reference; and U.S. patent application Ser. No. 08/956,537, entitled A Method and Apparatus for Providing Image and Graphics Processing Using A Graphics Rendering Engine, filed Oct. 23, 1997 and which is incorporated herein by reference.

BACKGROUND OF THE INVENTION

1. Field of the Invention

The present invention is related to computer graphics hardware for which OPENGL (GRAPHICS LIBRARY) software is an interface thereto, and, in particular, to improving by diagonal level-of-detail calculations texture locality for pixel quads stored in a texture cache of the computer graphics hardware.

2. Description of the Related Art

Interactive graphics display, in general, is explained in *Computer Graphics: Principles and Practices,* Foley, vanDam, Feiner, and Hughes, Addison-Wesley, 1992, and in *Principles of Interactive Computer Graphics,* William M. Newman and Robert F. Sproull, Second Edition, McGraw-Hill Book Company, New York, 1979. Interactive graphics display generally includes a frame buffer storing pixels (or picture elements), a display, and a display controller that transmits the contents of the frame buffer to the display.

The OpenGL graphics system is a software interface to graphics hardware, and is explained in the *OpenGL Programming Guide, The Official Guide to Learning OpenGL, Second Edition, Release* 1.1, by the OpenGL Architecture Review Board, Jackie Neider, Tom Davis, Mason Woo, Addison-Wesley Developers Press, Reading, Mass., 1997, in the *OpenGL Programming Guide, The Official Guide to Learning OpenGL, Release* 1, by the OpenGL Architecture Review Board, Jackie Neider, Tom Davis, Mason Woo, Addison-Wesley Publishing Company, Reading, Mass., 1993, and in the *OpenGL Reference Manual, The Official Reference Document for OpenGL, Release* 1, the OpenGl Architecture Review Board, Addison-Wesley Publishing Company, Reading, Mass., 1993.

A computer model for interpretation of OpenGL commands is a client-server model. An application program being executed by one computer, typically the client computer, issues commands, which are interpreted and processed by another computer, typically the server computer, on which OpenGL is implemented. The client may or may not operate on the same computer as the server. A computer, then, can make calls through an OpenGL software interface to graphics hardware, and the graphics hardware can reside either on the same computer making the calls or on a remote computer.

A tool for describing how data is processed in OpenGL is a processing pipeline. The OpenGL processing pipeline 10 shown in FIG. 1 receives commands, and may store the commands for future processing in a display list 14 or execute the commands immediately. The OpenGL processing pipeline includes an evaluator 16, which approximates curve and surface geometry by evaluating polynomial commands of the input values; per-vertex operations and primitive assembly 18, in which geometric primitives such as points, line segments, and polygons, described by vertices, are processed, such as transforming and lighting the vertices, and clipping the primitives into a viewing volume; rasterization 20 produces a series of frame buffer addresses and associated values, and converts a projected point, line, or polygon, or the pixels of a bitmap or image, to fragments, each corresponding to a pixel in the framebuffer; per-fragment operations 22 performs operations such as conditional updates to the frame buffer 24 based on incoming and previously stored depth values (to effect depth buffering) and blending of incoming pixel colors with stored colors, masking, and other logical operations on pixel values. The final pixel values are then stored in the frame buffer 24.

Pixel operations 26 processes input data from the commands 12 which is in the form of pixels rather than vertices. The result of the pixel operations 26 is stored in texture memory 28, for use in rasterization 20. The resulting fragments are merged into the frame buffer 24 as if the fragments were generated from geometric data.

In addition, if texturing is enabled during rasterization 20, a texel is generated from texture memory 28 for each fragment and applied to the fragment. A texel is a texture element obtained from texture memory and represents the color of the texture to be applied to a corresponding fragment. Texturing maps a portion of a specified texture image onto each primitive. Texture mapping is accomplished by using the color (Red (R), Green (G), Blue (B), or Alpha (A)) of the texture image at the location indicated by the fragment's (s, t, and r) coordinates. In the case of a 2-dimensional image (2-D image), s and t coordinates are applicable, and in the case of a 3-dimensional image (3-D image), then s, t, and r coordinates are applicable.

OpenGL provides a way to specify the details of how texturing of a primitive is effected. These details include specification of the image to be texture mapped, the means by which the image is filtered when applied to the primitive, and the function that determines what RGBA value is produced given a fragment color and an image value. A command specifying the target, level, internal format, width, height, border, format, type, and *data (a pointer to the data) is used to specify the texture image in GL commands such as TexImage2D or TexImage1D. The level argument is an integer level-of-detail number. The main texture image has a level of detail number of 0, and if a level of detail less than 0 is specified, an error message is generated.

The maximum allowable width or height of the image is an implementation dependent function of the level of detail and internal format of the resulting image array. An image with zero height or width indicates the null texture. If the null texture is specified for level of detail zero, it is as if texturing were disabled.

The image indicated to the GL (or graphics library) by the image pointer is decoded and copied into the GL's internal memory. This copying effectively places the decoded image inside a border of the maximum allowable width, which is currently 1, whether or not a border has been specified.

An example of a texture image 29 and the coordinates used to access it is shown in FIG. 2. FIG. 2 shows a two-dimensional texture image with n×m dimensions of n=3 and m=2. A one-dimensional texture would comprise a single strip. The values, α and β, used in blending adjacent texels to obtain a texture value are also shown. As shown in FIG. 2, values of s and t coordinates are each in the range of 0.0 to 1.0.

If no border or a border smaller than the maximum allowable width has been specified, then the image is still stored as if it were surrounded by a border of the maximum possible width. Any excess border (which surrounds the specified image, including any border) is assigned unspecified values. A one-dimensional texture has a border only at its left and right ends.

The decoded image is referred to as the texture array. A two-dimensional texture array has width $w_t=2^n+2b_t$ and height $h_t=2^m+2b_t$, where $b_t$ is the maximum allowable border width; and a one-dimensional texture array has width $w_t=2^n+2b_t$ and height $h_t=1$.

Texturing, including determination of the level of detail and selection of a mipmap, of the related art is now discussed, with reference being made to OpenGL commands using the OpenGL command syntax.

Object coordinates (x, y, z, and w) and texture coordinates (s, t, r, and q) are provided for each vertex.

A texel is an element (i, j) of the texture array (for a 1-dimensional array, j is irrelevant). The texture value used in texturing a fragment is determined by that fragment's associated (s, t) coordinates, but as shown in FIG. 2 may not correspond to any actual texel.

Typically, there are 8 neighboring texels for each pixel, which means that 8 texels encompass or surround each pixel.

Texture images may also be specified using image data taken directly from the framebuffer, and rectangular subregions of existing texture images may be respecified.

If texture wrapping for the s or t coordinates is set to be repeated (by setting parameters such as TEXTURE_WRAP_S or TEXTURE_WRAP_T to REPEAT), then the GL ignores the integer part of the s or t coordinates, respectively, using only the fractional part. For a number r, the fractional part is $r-\lfloor r \rfloor$, regardless of the sign of r, and the floor function truncates towards $-\infty$. The parameter CLAMP causes s or t coordinates to be clamped to the range [0,1]. The initial state is for both s and t behavior to be that given by the repeat value.

Applying a texture to a primitive implies a mapping from texture image space to framebuffer image space. In general, this mapping involves a reconstruction of the sampled texture image, followed by a projective warping implied by the mapping to framebuffer space, then a filtering, followed finally by a resampling of the filtered, warped, reconstructed image before applying it to a fragment.

In the GL, this mapping is approximated by one of two simple filtering schemes. One of these schemes is selected based on whether the mapping from texture space to framebuffer space is deemed to magnify or minify the texture image. The choice is governed by a scale factor ρ(x, y) and $\lambda(x, y) = \log_2[\rho(x, y)]$; if $\lambda(x, y)$ is less than or equal to a constant (the selection of the constant is described herein below) the texture is said to be magnified; if it is greater, the texture is minified. λ is referred to as the level of detail.

Let s(x, y) be the function that associates an s texture coordinate with each set of window coordinates (x, y) that lie within a primitive, and t(x, y) be defined analogously. Let $u(x, y)=2^n s(x, y)$ and $v(x, y)=2^m t(x, y)$ (for a one-dimensional texture, define v(x, y)=0). For a polygon, ρ is given at a fragment with window coordinates (x, y) by $$\rho = \max\left\{\sqrt{\left(\frac{\partial u}{\partial x}\right)^2 + \left(\frac{\partial v}{\partial x}\right)^2}, \sqrt{\left(\frac{\partial u}{\partial y}\right)^2 + \left(\frac{\partial V}{\partial y}\right)^2}\right\} \quad (1)$$

where ∂u/∂x indicates the derivative of u with respect to window x, and similarly for the other derivatives. Equation (1) is rotationally invariant, which means that if the image is rotated around, the same level of detail is provided. However, equation (1) is very compute-intensive.

For a line, the formula is $$\rho = \sqrt{\left(\frac{\partial u}{\partial x}\Delta x + \frac{\partial u}{\partial y}\Delta y\right)^2 + \left(\frac{\partial v}{\partial x}\Delta x + \frac{\partial v}{\partial y}\Delta y\right)^2} \Big/ l, \quad (2)$$

where $\Delta x = x_2 - x_1$ and $\Delta y = y_2 - y_1$ with $(x_1, y_1)$ and $(x_2, y_2)$ being the segment's window coordinate endpoints and $l = \sqrt{\Delta x^2 + \Delta y^2}$. For a point, pixel rectangle, or bitmap, ρ=1.

While equations (1) and (2) give the best results when texturing, they are often impractical to implement. Therefore, an implementation may approximate the ideal ρ with a function f(x, y) subject to these conditions:

1. f(x, y) is continuous and monotonically increasing in each of $|\partial u/\partial y|, |\partial v/\partial x|$, and $|\partial v/\partial y|$,
2. Let $$m_u = \max\left\{\left|\frac{\partial u}{\partial x}\right|, \left|\frac{\partial u}{\partial y}\right|\right\} \text{ and } m_v = \max\left\{\left|\frac{\partial v}{\partial x}\right|, \left|\frac{\partial v}{\partial y}\right|\right\}$$

Then $\max\{m_u, m_v\} \leq f(x,y) \leq m_u + m_v$. $\max\{m_u, m_v\}$ is the rectangular level of detail calculation, and $m_u + m_v$ is the fuzziest permissible limit, but is very fuzzy.

When λ indicates minification, the value assigned to the TEXTURE_MIN_FILTER parameter is used to determine how the texture value for a fragment is selected. When TEXTURE_MIN_FILTER is NEAREST, the texel nearest (in Manhattan distance) to that specified by (s,t) is obtained. This means the texel at location (i,j) becomes the texture value, with i given by $$i = \begin{cases} \lfloor u \rfloor, & s < 1, \\ 2^n - 1, & s = 1. \end{cases} \quad (3)$$

If TEXTURE_WRAP_S is REPEAT, then $0 \leq s < 1$. Similarly, j is found as $$j = \begin{cases} \lfloor v \rfloor, & t < 1, \\ 2^m - 1, & t = 1. \end{cases} \quad (4)$$

For a one-dimensional texture, j is irrelevant; the texel at location i becomes the texture value.

When TEXTURE_MIN_FILTER is LINEAR a 2×2 square of texels is selected. This square is obtained by first computing $$i_0 = \begin{cases} \lfloor u - 1/2 \rfloor \bmod 2^n, & TEXTURE\_WRAP\_S \text{ is } REPEAT, \\ \lfloor u - 1/2 \rfloor, & TEXTURE\_WRAP\_S \text{ is } CLAMP \end{cases}$$

and $$j_0 = \begin{cases} \lfloor v-1/2 \rfloor mod 2^m, & TEXTURE\_WRAP\_T \text{ is } REPEAT, \\ \lfloor v-1/2 \rfloor, & TEXTURE\_WRAP\_T \text{ is } CLAMP \end{cases}$$

Then $$i_1 = \begin{cases} (i_0+1) mod 2^n, & TEXTURE\_WRAP\_S \text{ is } REPEAT, \\ i_0+1, & TEXTURE\_WRAP\_S \text{ is } CLAMP \end{cases}$$

and

Let $\alpha = frac(u-\frac{1}{2})$ and $\beta = frac(v-\frac{1}{2})$ $$j_1 = \begin{cases} (j_0+1) mod 2^m, & TEXTURE\_WRAP\_T \text{ is } REPEAT, \\ j_0+1, & TEXTURE\_WRAP\_T \text{ is } CLAMP \end{cases}$$

where frac(x) denotes the fractional part of x. Let $\tau_{ij}$ be the texel at location (i,j) in the texture image. Then the texture value, $\tau$, is found as $$\tau=(1-\alpha)(1-\beta)\tau_{i_0j_0}+\alpha(1-\beta)\tau_{i_1j_0}+(1-\alpha)\beta\tau_{i_0j_1}+\alpha\beta\tau_{i_1j_1} \quad (5)$$

for a two-dimensional texture.

For a one-dimensional texture, $$\tau=(1-\alpha)\tau_{i_0}+\alpha\tau_{i_1} \quad (6)$$

where $\tau_i$ indicates the texel at location i in the one-dimensional texture. If any of the selected $\tau_{ij}$ (or $\tau_i$) in the above equations refer to a border texel with $i<-b_s$, $j<-b_s$, $i \geq w_s-b_s$, or $j \geq h_s-b_s$, then the border color given by the current setting of the parameter TEXTURE_BORDER_COLOR is used instead of the unspecified value or values.

The RGBA values of the TEXTURE_BORDER_COLOR are interpreted to match the texture's internal format in a manner consistent with Table 1.

TABLE 1

| Base Internal Format | RGBA Values | Texture Components |
|---|---|---|
| ALPHA | A | A |
| LUMINANCE | R | L |
| LUMINANCE ALPHA | R,A | L,A |
| INTENSITY | R | I |
| RGB | R,G,B | R,G,B |
| RGBA | R,G,B,A | R,G,B,A |

OpenGL parameters of TEXTURE_MIN_FILTER, including NEAREST_MIPMAP_NEAREST, NEAREST_MIPMAP_LINEAR, LINEAR_MIPMAP_NEAREST, and LINEAR_MIPMAP_LINEAR, each require the use of a mipmap. A mipmap is an ordered set of arrays representing the same image; each array has a resolution lower than the previous one. If the texture has dimensions $2^n \times 2^m$, then there are max{n,m}+1 mipmap arrays. The first array is the original texture with dimensions $2^n \times 2^m$. Each subsequent array has dimensions $2^{(k-1)} \times 2^{(l-1)}$ where $2^k \times 2^l$ are the dimensions of the previous array. This is the case as long as both k>0 and l>0. Once either k=0 or l=0, each subsequent array has dimension $1 \times 2^{(l-1)}$ or $2^{(k-1)} \times 1$, respectively, until the last array is reached with dimension 1×1.

Each array in a mipmap is transmitted to the GL using TexImage2D or TexImage1D; the array being set is indicated with the level-of-detail argument. Level-of-detail numbers proceed from 0 for the original texture array through p=max{n,m} with each unit increase indicating an array of half the dimensions of the previous one as already described. If texturing is enabled (and TEXTURE_MIN_FILTER is one that requires a mipmap) at the time a primitive is rasterized and if the set of arrays 0 through p is incomplete, based on the dimensions of array 0, then it is as if texture mapping were disabled. The set of arrays 0 through p is incomplete if the internal formats of all the mipmap arrays were not specified with the same symbolic constant, or if the border widths of the mipmap arrays are not the same, or if the dimensions of the mipmap arrays do not follow the sequence described above. Arrays indexed greater than p are insignificant.

The mipmap is used in conjunction with the level of detail to approximate the application of an appropriately filtered texture to a fragment.

Let p=max{n,m} and let c be the value of $\lambda$ at which the transition from minification to magnification occurs, and, for minification, values of $\lambda$ where $\lambda > c$ are applicable. For the NEAREST_MIPMAP_NEAREST parameter, if $c < \lambda \leq 0.5$ then the mipmap array with level-of-detail of 0 is selected. Otherwise, the dth mipmap array is selected when $d-\frac{1}{2} < \lambda \leq d+\frac{1}{2}$ as long as $1 \leq d \leq p$. If $\lambda > p+\frac{1}{2}$, then the pth mipmap array is selected. The rules for NEAREST are then applied to the selected array.

The same mipmap array selection rules apply for LINEAR_MIPMAP_NEAREST as for NEAREST_MIPMAP_NEAREST, but the rules for LINEAR are applied to the selected array.

For NEAREST_MIPMAP_LINEAR, the level d-1 and the level d mipmap arrays are selected, where $d-1 \leq \lambda < d$, unless $\lambda \geq p$, in which case the pth mipmap array is used for both arrays. The rules for NEAREST are then applied to each of these arrays, yielding two corresponding texture values $\tau_{d-1}$ and $\tau_d$. The final texture value is then found as $$\tau=[1-frac(\lambda)]\tau_{d-1}+frac(\lambda)\tau_d. \quad (7)$$

LINEAR_MIPMAP_LINEAR has the same effect as LINEAR_MIPMAP_LINEAR except that the rules for LINEAR are applied for each of the two mipmap arrays to generate $\tau_{d-1}$ and $\tau_d$.

Texture magnification is now explained. When $\lambda$ indicates magnification, the value assigned to TEXTURE_MAG_FILTER determines how the texture value is obtained. There are two possible values for TEXTURE_MAG_FILTER: NEAREST and LINEAR. NEAREST behaves exactly as NEAREST for TEXTURE_MIN_FILTER (equation (3) and (4) are used); LINEAR behaves exactly as LINEAR for TEXTURE_MIN_FILTER (equation (5) is used). The level-of-detail 0 texture array is always used for magnification.

In addition, there is a choice of c, the minification vs. magnification switch-over point. If the magnification filter is given by LINEAR and the minification filter is given by NEAREST_MIPMAP_NEAREST or NEAREST_MIPMAP_LINEAR, then c=0.5. This is done to ensure that a minified texture does not appear "sharper" than a magnified texture. Otherwise, c=0.

Multiple levels of detail in OpenGL allow textured objects to be viewed at different distances from a viewpoisnt by determining which of the mipmap images in a pyramid of mipmaps of the same image to select, and by filtering between 2 levels of detail to minimize aliasing artifacts.

Mipmapping prevents aliasing in texel space and eliminates aliasing artifacts by blurring between levels of detail, one of which is not aliasing and the other of which is slightly aliasing. For example, a brick wall would appear as noise without aliasing if a full resolution image of the brick wall were to be applied to a brick wall that is far enough from the viewer to appear as a single pixel.

In the related art, if magnification or minification is selected, and if the parameter GL_LINEAR is selected, a weighted linear average of the 2×2 array of texels that lies nearest to the center of the pixel is used.

In standard OpenGL (which is also referred to as GL), the quality of a displayed image ranges between fuzzy and sharp.

To obtain a sharp image, the level of detail is calculated in the related art using the rectangular maximum absolute difference of the s and t coordinates. In the related art, for the 2 adjacent coordinates in the x and y directions, the s and t coordinates are calculated, and the maximum absolute difference horizontally and vertically of the s and t coordinates is determined. Accordingly, in standard GL, the level of detail is equal to $\log_2$ row.

To obtain a fuzzy image in the related art, different level of detail calculations are performed, such as calculating the sum of the maximum absolute values of the s and t coordinates. In the related art, the level of detail value must fall between the rectangular level of detail and the sum of the maximum of the absolute values. As explained herein above, $\max\{m_u, m_v\}$ is the rectangular level of detail calculation, and $m_u + m_v$ is the fuzziest permissible limit, but is very fuzzy.

Traditional level of detail calculations of the related art require a 5×5 texel footprint to be stored in texture memory to provide a sufficient number of texels for texturing of each 2×2 region of pixels stored in the framebuffer. Each 2×2 region of pixels stored in the framebuffer is referred to as a quad. A 5×5 texel footprint is required because the traditional level of detail calculations involve determining the rectangular absolute difference of texture coordinates. However, requiring a 5×5 texel footprint is an inefficient use of hardware, because most computer systems are optimized to manipulate $2^n$ numbers, where n is a whole number.

A problem in the related art is that for each pixel within the quad of pixels, processing must include the s and t coordinates and the level of detail for each of the 8 texels surrounding the s and t coordinates at that pixel.

A further problem of the related art is that a large amount of texture memory is required to store the s and t coordinates and the level of detail corresponding to each pixel for each of the four or eight neighbors of that pixel.

SUMMARY OF THE INVENTION

The present invention solves the above-mentioned problems of the related art.

An object of the present invention is to maintain the footprint within a 4×4 texel region for a quad of pixels.

Another object of the present invention is to redefine the level of detail calculations to virtually guarantee that all texels are within the 4×4 texel footprint.

Still another object of the present invention is to reduce the amount of storage space required in a texture cache storing texels.

Still a further object of the present invention is to allow a simplified texture cache to provide improved performance for no additional cost beyond the traditional level of detail calculations.

Another object of the present invention is to provide an image having a better appearance after the level of detail calculation is performed.

A further object of the present invention is to provide a level of detail calculation that remains fully compliant with OpenGL standards.

The present invention overcomes the problems in the related art and accomplishes the above-mentioned objects.

To accomplish the above-mentioned objects, the present invention is an OpenGL-compliant, dedicated hardware display controller which stores for each 2×2 footprint of pixels (quads) stored in the framebuffer a corresponding 4×4 footprint of texels in the texture memory, and performs level of detail calculations on diagonals of pixels within the 2×2 footprint of pixels. In particular, the present invention defines the level of detail calculations to be the diagonal maximum of the absolute difference of texture coordinates. By performing level of detail calculations as in the present invention producing a 4×4 footprint of texels, hardware performance is enhanced because the calculations are performed on $2^n$ pixels, and, further, the appearance of the rendered image is enhance because less aliasing occurs along the diagonals of the pixels.

In the present invention, by determining the maximum of the absolute difference of the s and t coordinates along the diagonal between the pixels of a quad in each direction, texels required by the quad of pixels are almost always guaranteed to fall within a 4×4 element region, or footprint. The qualitative result of the present invention is an image which is almost as sharp as the sharpest allowable standard GL image, but as sharp or sharper than the fuzziest allowable GL image.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention resides in a single-chip implementation of OpenGL, in which matrices are composed on a host computer and evaluated on the single chip.

Figure 1:
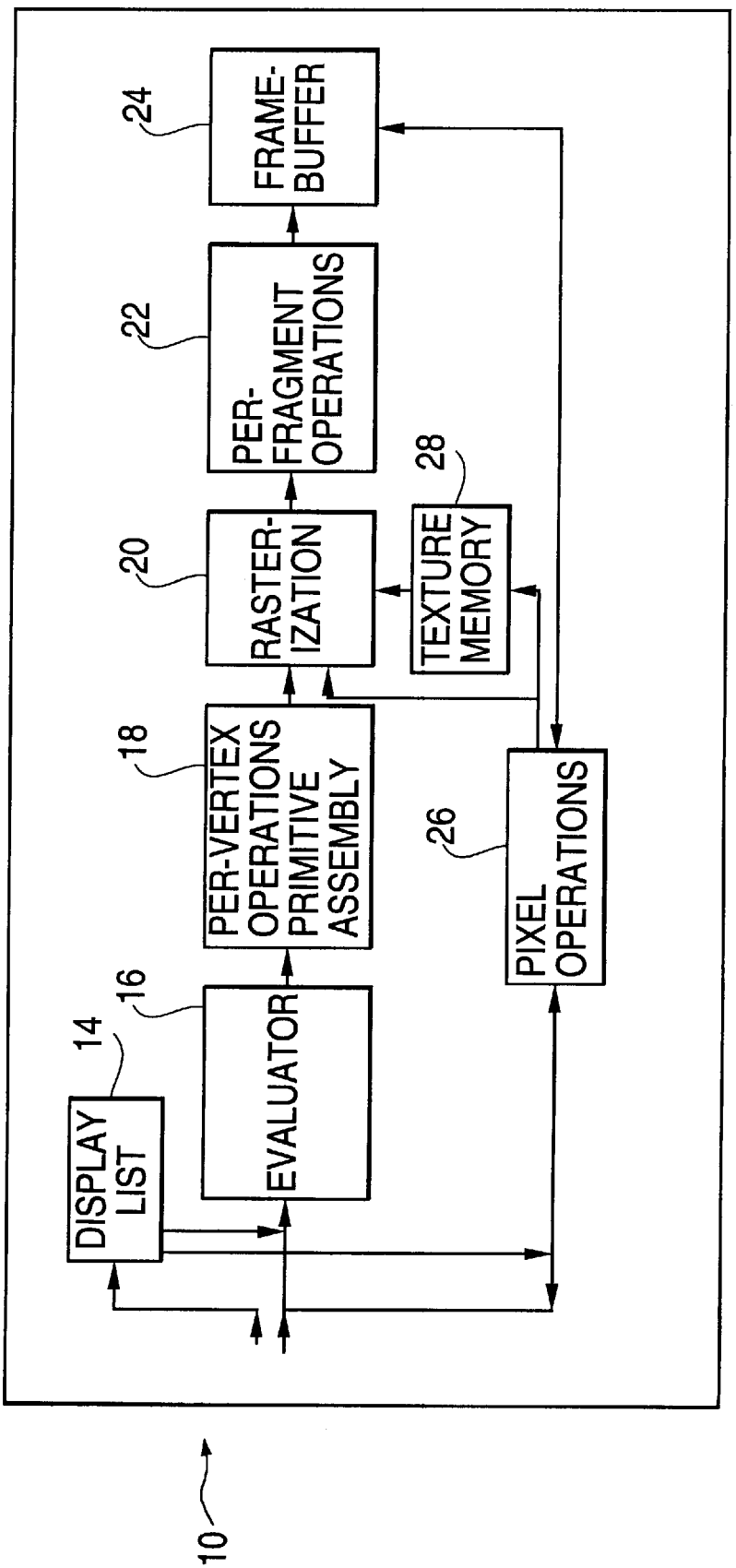
FIG. 1 is a diagram of an OpenGL processing pipeline of the related art.
Figure 2:
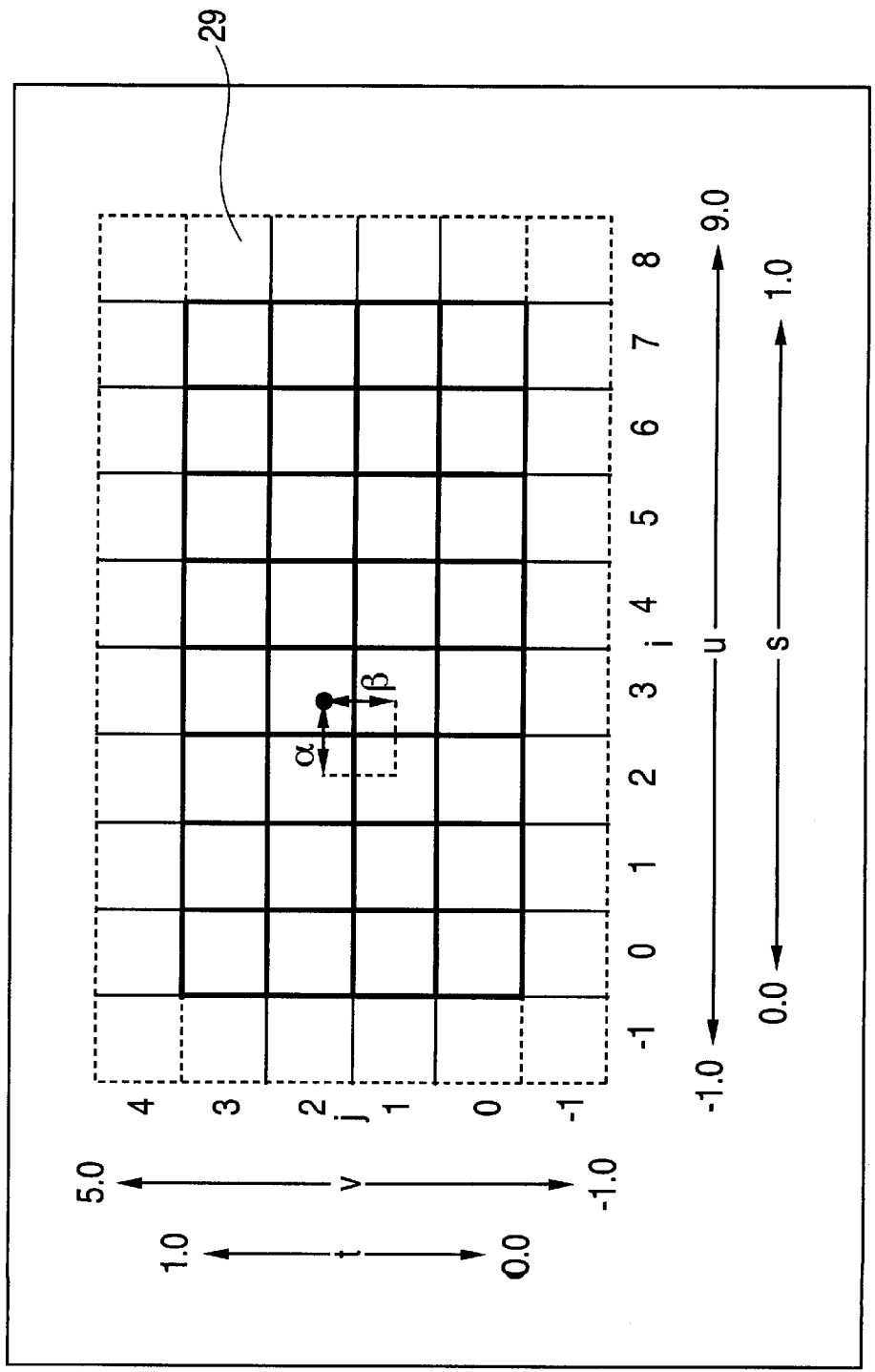
FIG. 2 is a diagram of a texture image and the coordinates used to access it.
Figure 3:
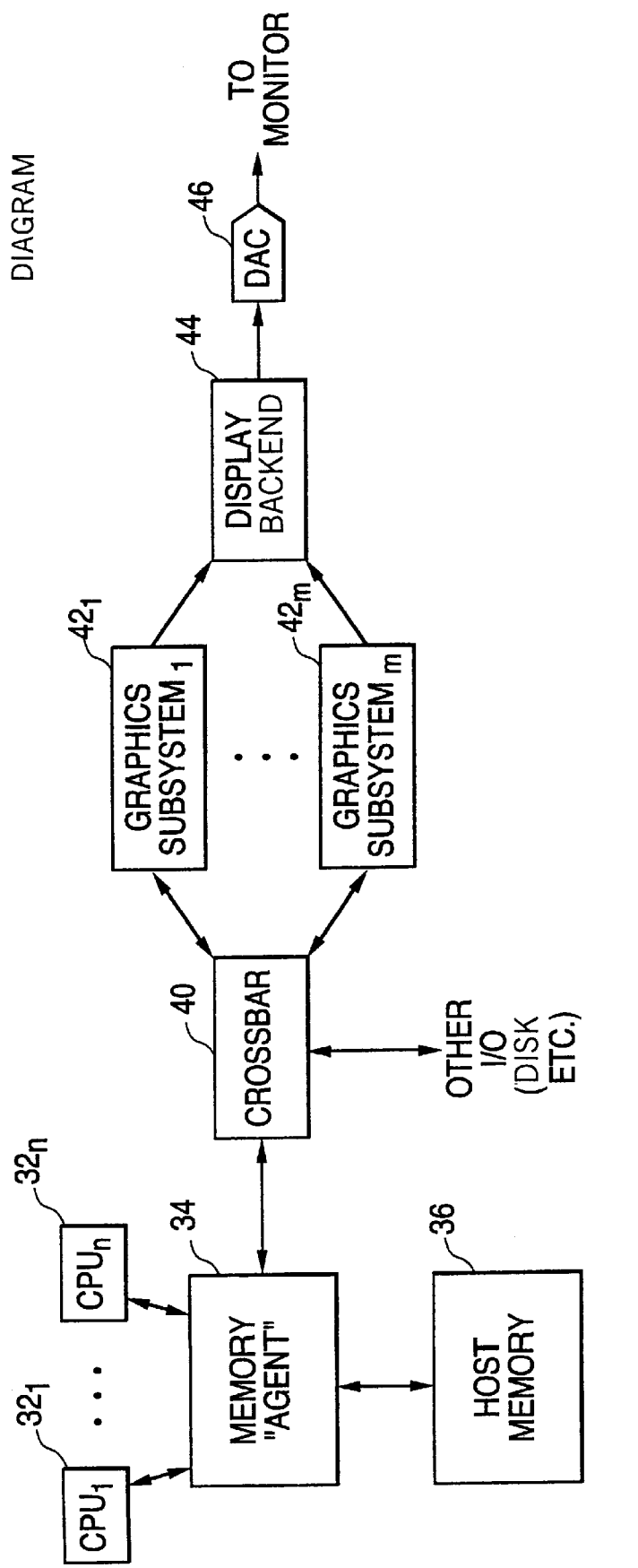
FIG. 3 is a block diagram of a graphics system according to the present invention.

As shown in FIG. 3, in the graphics system 30 according to the present invention, central processing units (CPUs) $32_1$ through $32_n$ execute OpenGL software commands 12 (not shown in FIG. 3), using memory agent 34 and host memory 36. A command stream, which is analogous to subroutine calls calling an OpenGL API library, is pushed immediately by the CPU to be executed by the hardware implementing the OpenGL system, and, accordingly, a push model is representative of the OpenGL system.

The memory agent 34 then transmits the commands 12 to crossbar switch 40. Then, commands 12 are transmitted to graphic subsystems $42_1$ through $42_m$, which process the commands 12 in a token stream (commands, including GL commands, are mapped to integer tokens), as described in further detail herein below. After graphic subsystems $42_1$ through $42_m$ process the commands 12, a display backend 44 transfers the processed data to digital-to-analog (DAC) converter 46, then to a monitor for display.

Figure 4:
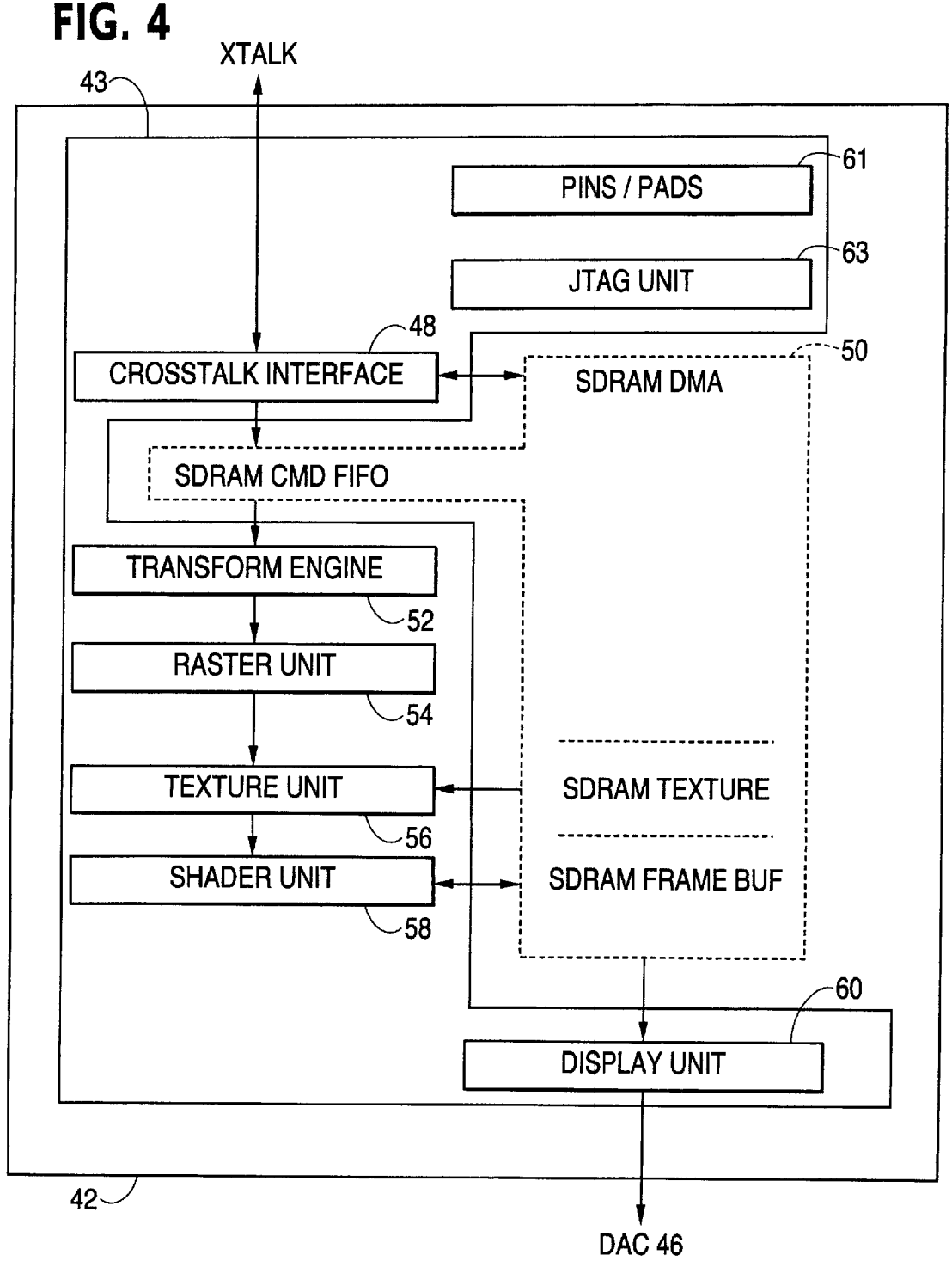
FIG. 4 is a block diagram of a hardware organization of a chip implementing the present invention.

FIG. 4 is a block diagram of a graphic subsystem 42 of the present invention. Graphics subsystem 42 comprises graphics chip 43 and SDRAM 50, coupled to graphics chip 43.

As shown in FIG. 4, CROSSTALK interface 48, which is also referred to as a graphics front end, interfaces to the rest of the graphic system 30 through XTALK (or CROSSTALK). CROSSTALK is a router/connection unit available from Silicon Graphics, Inc. Graphics front end 48 comprises a XTALK peer-to-peer interface, a DMA engine (including formatting), and a command first-in, first-out (fifo) buffer. The command fifo is maintained in SDRAM 50, as shown in FIG. 4. The command fifo is nominally 1 ms. worth of latency.

Graphics front end 48 also directs incoming streams to intended destinations, provides all support for chained graphics subsystems 42 in multi-subsystems 42 configurations, provides access in and out for the SDRAM 50, provides DMA channels for graphics and video, formats input and output streams, manages context switching and context states, provides a read path for graphics registers, and provides access to the display backend 44 through Display Unit 60.

Also as shown in FIG. 4, Transform Engine 52 interfaces to both the graphics front end 48 and the raster unit 54 on a first-in, first-out basis, receives commands and data from the graphics front end 48, and sends computed data to raster unit 54. The main computations performed in the transform engine 52 include geometry transforms of both vertices and normals (MVP and MV matrices). Transform Engine 52 is responsible for all geometry calculations in graphics subsystem 42, including performing vertex transforms and lighting computations for Phong Shading, and Gouraud Shading. In addition, Transform Engine 52 performs texture transform.

Raster unit 54 of FIG. 4 parses command tokens transmitted from the Transform Engine 52, schedules all SDRAM 50 memory transactions, rasterizes each primitive by recursive subdivision, and generates perspective-corrected barycentric parameters which are used to bi-lerp (bilinear interpolate) among the 3 vertices for each triangle. Raster unit 54 also includes the framebuffer cache.

In addition, raster unit 54 includes line and point antialiasing, and the control for a framebuffer cache. Frustum clipping is effectively performed by the recursive subdivision rasterization in raster unit 54, and user clipped planes are performed using the sign bit of the bi-lerps for the texture coordinates to invalidate user-clipped pixels.

Barycentric coordinates for a triangle are a set of three numbers a, b, and c, each in the range of (0,1), with a+b+c=1 and which uniquely specify any point within the triangle or on the triangle's boundary. For example, a point P in a triangle having vertices A, B, and C, and area a from the triangle having vertices P, B, and C (the edge within the triangle opposite from the vertex A), area b from the triangle having vertices P, C, and A (the edge within the triangle opposite from the vertex B), and area c from the triangle having vertices P, A, and B (the edge within the triangle opposite from the vertex C) is given by $$P=(Axa+Bxb+Cxc)/(a+b+c).$$

Raster unit 54 also generates an attribute tag pipeline 84 and a barycentric coordinate pipeline 86, which are discussed in further detail herein below, and which are generated after generation of the barycentric coordinates. Raster unit 54 performs Hilbert curve rasterization.

A graphics pipeline may include attributes, a coverage mask, and barycentric coordinates. In the present invention, the graphics pipeline would include the attribute token pipeline 82, the barycentric pipeline 86, the attribute tag pipeline 84, and hardware elements comprising the raster unit 54, the texture unit 56, and the shader unit 58, explained in detail herein below.

Raster unit 54 receives the attribute token pipeline 82 from software executed on a host computer. The attribute token pipeline 82 transmits data originating from OpenGL calls executed on the host computer. The attribute token pipeline 82 is formed when the above-mentioned OpenGL calls are translated into the data by a driver available from Silicon Graphics, Inc. running on the host computer and are transmitted to the graphics chip 43.

Also as shown in FIG. 4, texture unit 56 includes level of detail calculation, texture addressing, control for the texture cache, the texture tree filter for lerps (linearly interpolate) and the TLUT (texture color lookup table). Texture unit 56 also includes an SRAM for an on-chip texture cache, and the texture cache SRAM is organized as 16 banks×512 words× 48 bits. Texture unit 56 is explained in further detail herein below.

Shader unit 58 shown in FIG. 3 includes shading and depth bi-lerps, per-pixel lighting, pre-lighting texture environments and post-lighting texture environments, fog, multi-fragment polygon antialiasing, and per-fragment tests and operations.

A display unit 60 is provided in each graphics subsystem 42, as shown in FIG. 4. The display backend 44 shown in FIG. 3 includes the display units 60 of the graphics subsystems 42, and additional functions. The display unit 60 shown in FIG. 4 includes all of the pixel processing which occurs between the framebuffer and the output of the graphics subsystem 42 to the DAC or display backend 44. The display backend 44 combines the output from multiple graphic subsystems 42 for output by the DAC 46, or divides the output from the graphics system 30 to up to 4 DACs 46.

The display unit 60, transfers pixels and OID/WID data from the framebuffer interface into first-in, first-out queues (FIFOs), changes pixels from the framebuffer format into a standard format RGB component format, maps color indexed into final RGB pixel values and applies gamma correction to all pixel data, generates all timing control signals for the various parts of the display unit 60, and provides read and write access to registers and memories in the display unit 60.

The graphics chip 43 of the present invention also includes pins/pads 61 for physical access to the graphics chip 43, and JTAG unit 63 for chip testing purposes.

The present invention resides in Texture Unit 56. Texture Unit 56, along with Raster Unit 54 (including Scheduler 102) and Shader Unit 58), is described in detail in A Method for Efficient Handling of Texture Cache Misses by Recirculation. An overview of Texture Unit 56 is presented herein, and the present invention is described in detail with reference to FIGS. 5–14.

Attributes are transmitted throughout the graphic subsystem 42, which includes vertex data such as the s and t coordinates, RGBA information, per-vertex information, coverage, etc.

Texture unit 56 includes all of the logic required to create a texture fragment (or texel) for combination with a pixel fragment at the blend stage of the rendering pipeline implemented by the graphic subsystem 42. Textures are preloaded from DMA.

Figure 5:
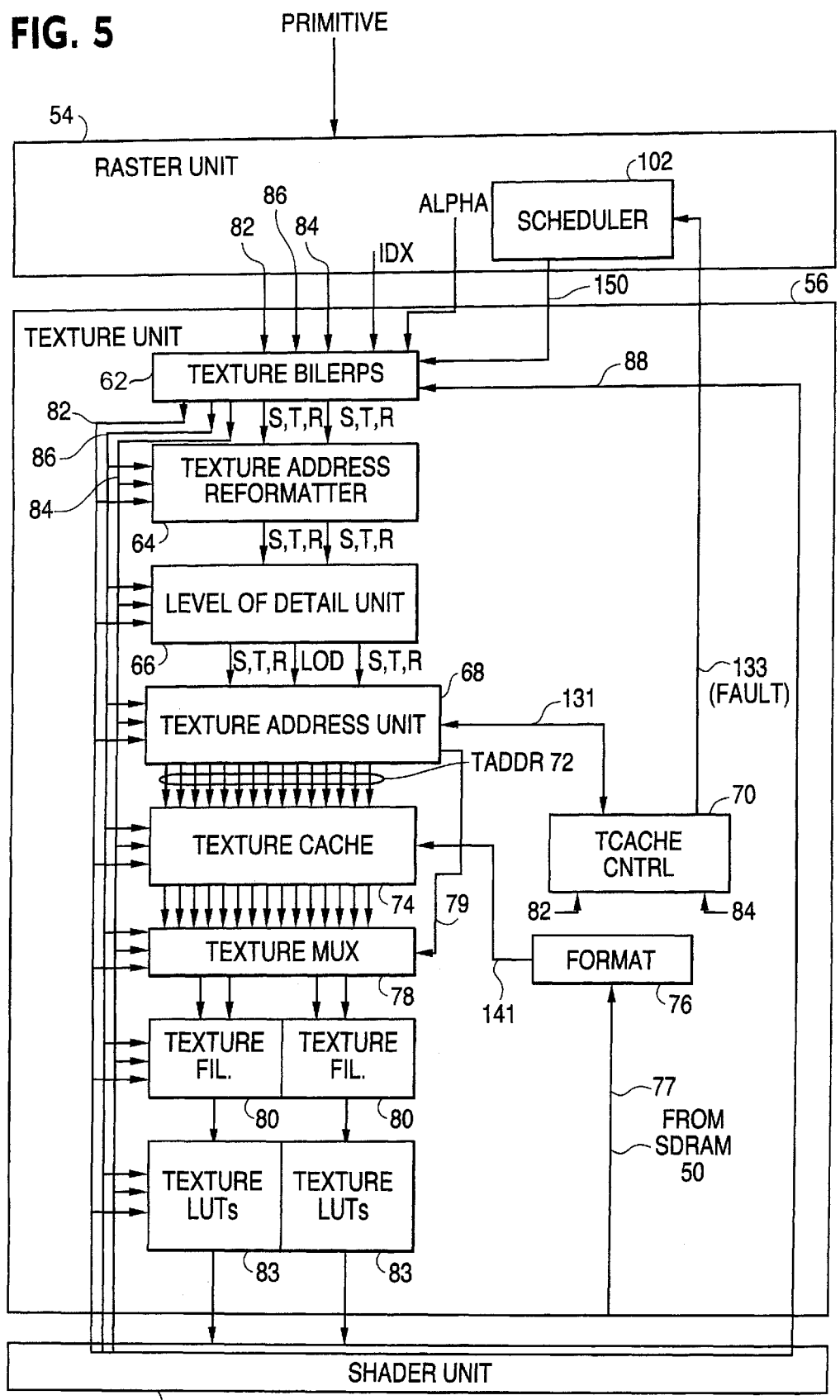
FIG. 5 is a detailed diagram of a texture unit of the present invention.

FIG. 5 is a block diagram of texture unit 56, which includes the focus of the present invention in level of detail unit 66. The raster unit 54 transmits attribute information, including S, T, and R coordinates, to the texture unit 56. The S and T coordinates may be generated by sources such as steppers, plane equation evaluators, bilinear interpolators, or other sources, and may be delivered by a pipeline. The S and T coordinates are then fed into the level of detail calculation of the present invention.

Attributes are transmitted throughout the graphic subsystem 42, which includes vertex data such as the s and t coordinates, RGBA information, per-vertex information, coverage, etc.

Texture unit 56 includes all of the logic required to create a texture fragment (or texel) for combination with a pixel fragment at the blend stage of the rendering pipeline implemented by the graphic subsystem 42. Textures are preloaded from DMA.

The texturing process implemented in the texture unit 56 begins with evaluation of texture coordinate quads (the S, T, and R, or s, t, and r, coordinates) corresponding to pixel coordinate quads (X, Y, and Z) in the texture bilerps 62. The texture bilerps 62 receive the attribute token pipeline 82, the barycentric coordinate pipeline 86, and the attribute tag pipeline 84 from the raster unit 54, and extract the s, t, and r coordinates therefrom. Each of the attribute token pipeline 82, the barycentric coordinate pipeline 86, and the attribute tag pipeline 84 originate in the raster unit 54. The texture bilerps 62 also receive the recirculation pipeline 88, which is a combination of the recirculated attributes, barycentric coordinates and coverage bits which occurs after a texture cache 74 miss, and determine which of the recirculated or newly-received data to transmit through the texture unit 56 and the shader unit 58, as explained in A Method for Efficient Handling of Texture Cache Misses by Recirculation.

In the texture unit 56, both of the attribute token pipeline 82 and the attribute tag pipeline 84 interface to texture bilerps 62, texture address reformatter 64, level of detail unit 66, texture address unit 68, tcache control 70, format unit 76, texture mux 78, texture filters 80, and texture LUTs 83. The barycentric pipeline 86 interfaces only to the texture bilerps 62.

The pixel quads arrive as pixel pairs in time multiplexed fashion at the input to the texture address reformatter 64. The texture address reformatter performs a float to fixed conversion on the coordinates for basic 1-dimensional, 2-dimensional, and 3-dimensional texturing modes.

Next, and also as shown in FIG. 5, for most texturing modes, and, in particular, for 1-dimensional and 2-dimensional texturing, a level of detail calculation is performed in the level of detail unit 66 based upon the pixel quads presented to the level of detail unit 66 from the texture address reformatter 64. The level of detail calculation derives the size of the texel in pixel space, and is the focus of the present invention as explained in further detail herein below.

Once the level of detail is computed, the quad of pixels in pairs of S, T, and R coordinates that entered the level of detail unit 66, along with a level of detail (LOD) value, are output by the level of detail unit 66, explained in further detail herein below. Addressing calculations can then be made in the texture address unit 68 based on the glTexparameter settings associated with the current texture image. GlTexparameter settings are part of the OpenGL graphics system described in the *OpenGL Programming Guide, The Official Guide to Learning OpenGL, Release* 1.1, id.

The texture address unit 68 then outputs a set of quad texel addresses 72 which are applied to the texture cache 74 so that a corresponding and proper set of texel fragments are retrieved from the texture cache 74 for eventual filtering. In mipmapping operations, the set of addresses fetches a four texel neighborhood from each of the two maps that bound the calculated size of the bilerped (bilinearly interpolated) quad. For non-mipmapped operations, only one map is available and therefore only the quad texel's footprint in that map is used in the filtering process.

The texture cache 74 is a direct mapped, hashed cache. Access to the texture cache 74 is explained in A Method for Accelerating Minified Texture Cache Access.

In addition, the texture address unit 68 interfaces to the texture cache control unit 70, which provides fault information to a scheduler in the raster unit 54. Further, the format unit 76 receives a 256-bit bus 77 from SDRAM 50, and provides input to the texture cache 74.

The output of the texture cache 74 is a 4×4 texels footprint, and, accordingly, 16 texels are output from the texture cache 74 at a time. The 16 texels are always adjacent (for example, 4 adjacent by 4 adjacent) to each other. The texture mux 78 selects 2×2 subregions of the 4×4 region. There are many different combinations of 2×2 regions of texels within the 4×4 region of texels of the image; for example, the lower left corner 2×2, the lower right corner 2×2, etc. The texture mux 78 selects any one of those combinations depending upon where the 2×2 subregion is situated relative to the 4×4 footprint.

The texture address unit 68 determines which 2×2 subregion that the texture mux 78 should select, based upon the tmux control signal 79 output by the texture address unit 68 to the texture mux 78. To determine which 2×2 subregion to select, the texture address unit 68 examines a quad of pixels flowing through the texture unit 56 through pipeline 82, and determines which 2×2 regions of the overall texture image must be pulled out to provide the required texels for each of the pixels. There is one 2×2 subregion required for each pixel in the quad of pixels, so 4 of the 2×2 subregions are selected by the texture address unit 68. Once the texture address unit 68 determines where the 4 of the 2×2 regions selected reside in the overall picture image, the texture address unit 68 attempts to narrow that down and fit all of the 2×2 subregions into one of the types of footprints that can be read from the texture cache 74, such as the 4×4 footprint.

In many cases, all 4 of the 2×2 subregions fit within the 4×4 footprint. For the pixels having corresponding texels within the 4×4 footprint, the corresponding texels are read from the texture cache 74. However, if all 4 of the 2×2 subregions do not fit within the 4×4 footprint, then additional texels not within the 4×4 footprint must be retrieved from the SDRAM 50. If additional texels not within the 4×4 footprint must be retrieved from the SDRAM 50, the quad of pixels is recirculated and, for the pixels having corresponding texels outside of the 4×4 footprint, the texels are read into the texture cache 74 from the SDRAM 50 during recirculation of the quad of pixels.

The texture address unit 68 determines which 2×2 subregion that the texture mux 78 should select, based upon the tmux control signal 79 output by the texture address unit 68 to the texture mux 78. To determine which 2×2 subregion to select, the texture address unit 68 examines a quad of pixels flowing through the texture unit 56 through attribute token pipeline 82, and determines which 2×2 regions of the overall texture image must be pulled out to provide the required texels for each of the pixels. There is one 2×2 subregion required for each pixel in the quad of pixels, so 4 of the 2×2 subregions are selected by the texture address unit 68. Once the texture address unit 68 determines where the 4 of the 2×2 regions selected reside in the overall picture image, the texture address unit 68 determines how many of the 2×2 subregions fit into one of the types of footprints that can be read from the texture cache 74, such as the 4×4 footprint.

The texture multiplexer 78 outputs selected 2×2 subregions.

In the final stages of the texturing process, various filtering functions are performed on the texels to calculate the ultimate contribution the texels make to the fragment color. The first filter operation is the actual weighted averaging of the mipmap neighborhoods to produce the interpolated texel fragment in texture filters 80.

The output of the texture filters 80 is presented to shader unit 58. In addition, pipelines 82, 84, and 86 feed into shader unit 58, and form recirculation bus 88. Recirculation bus 88, which recirculates texture addresses for a texture cache miss, is received from shader unit 58 into the texture bilerps 62.

Recirculation of the quad of pixels and selection of the 2×2 subregions are explained in A Method for Efficient Handling of Texture Cache Misses by Recirculation.

The texture unit 56 provides 1-dimensional, 2-dimensional, and 3-dimensional (orthographic) texture mapping with high performance.

The texture unit 56 has additional data paths and configurations not shown in FIG. 5 that allow the texture unit 56 to implement other advanced imaging operations such as convolutions and fast fourier transforms (FFTs) and asundry texture variants such as Pixel Texturing. Additional explanation is provided in A Method and Apparatus for Providing Image and Graphics Processing Using A Graphics Rendering Engine.

The particular features of the present invention reside in texturing, and, in particular, in level of detail unit 66 of FIG. 5, and are now described in detail with reference to FIGS. 5–14.

Texturing maps a portion of a specified image onto each primitive for which texturing is enabled. Texture mapping is accomplished by using the color of an image at the location indicated by a fragment's s, t, and r coordinates (r is currently ignored for 2-dimensional texturing) to modify the fragment's RGBA color. Texturing is specified only for RGBA mode, and its use in color index mode is undefined.

In the present invention, 3-dimensional mipmapping is not implemented. Also in the present invention, if 3-dimensional texturing were to be implemented, there would be no level of detail calculation performed for the 3-dimensional texturing. Since GL permits, and even requires, level of detail calculation for 3-dimensional texturing, software is defaulted to for same, so there is no acceleration for 3-dimensional mipmapped textures in the present invention. The diagonal level of detail calculation of the present invention is designed to make the 2-dimensional texel footprint fit within 4×4, and is not currently applicable to greater than 2 dimensions.

Texture address 72 shown in FIG. 5 is determined by texture address unit 68 based on 4 sets of S, T, and R (s, t, and r) coordinates passed through the level of detail unit 66. As above, the R (or r) coordinate is not used in the present invention since it only applies to 3-dimensional textures, even though shown in FIG. 8 and referred to herein. The texture address 72 is then presented to texture cache 74 shown in FIG. 5.

Also as shown in FIG. 5, level of detail unit 66 receives input from the sets of S, T, R coordinates from the texture address reformatter 68. The S, T, and R coordinates are passed through the level of detail unit 66 without the level of detail unit 66 further manipulating the S, T, and R coordinates. Level of detail calculations in accordance with the present invention are carried out by level of detail unit 66 of FIG. 5. The diagonal level of detail calculation of the present invention is based on the 4 sets of s and t coordinates received into the level of detail unit 66. In addition, texture coordinates are provided to the level of detail calculation by the attribute token pipeline 82, and constants which are functions of width and height of the texture established from the data structure when the texture is bound, are provided by the attribute tag pipeline 84.

S, T, and R coordinates correspond to each pixel, and, accordingly, there are four sets of S, T, and R coordinates for a quad of pixels. However, for each quad of pixels, there is one level of detail (LOD) value associated therewith.

As explained herein above, the level of detail determines which array in an ordered set of arrays representing the same image in a mipmap is selected for rendering, with each array having a lower resolution than the previous array.

The internal formats of all of the mipmap arrays must be previously specified at the time that a primitive is rasterized, and if the internal formats are incomplete, then texture mapping is treated as if disabled. The mipmap is used in conjunction with the level of detail to approximate the application of an appropriately filtered texture to a fragment.

Determination of the level of detail value associated with each quad of pixels and in accordance with the present invention is explained with reference to FIGS. 6(A)–13.

Figure 6B:
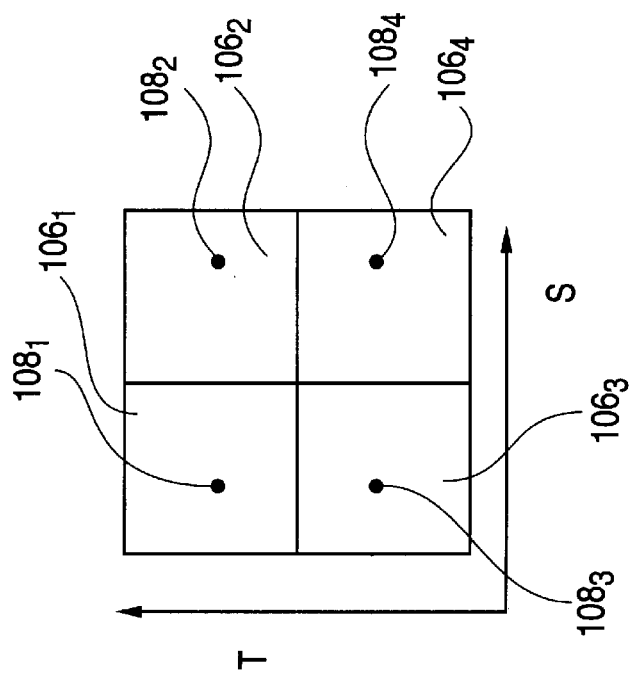
FIGS. 6(A), 6(B), and 6(C) are diagrams showing relationships between texels and pixels.
Figure 6A:
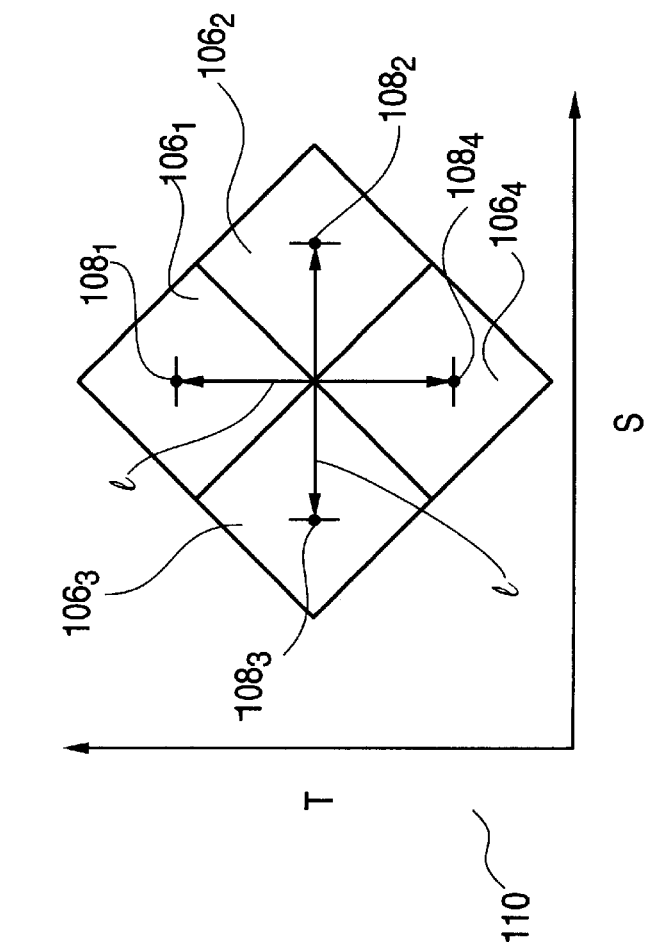
Figure 6C:
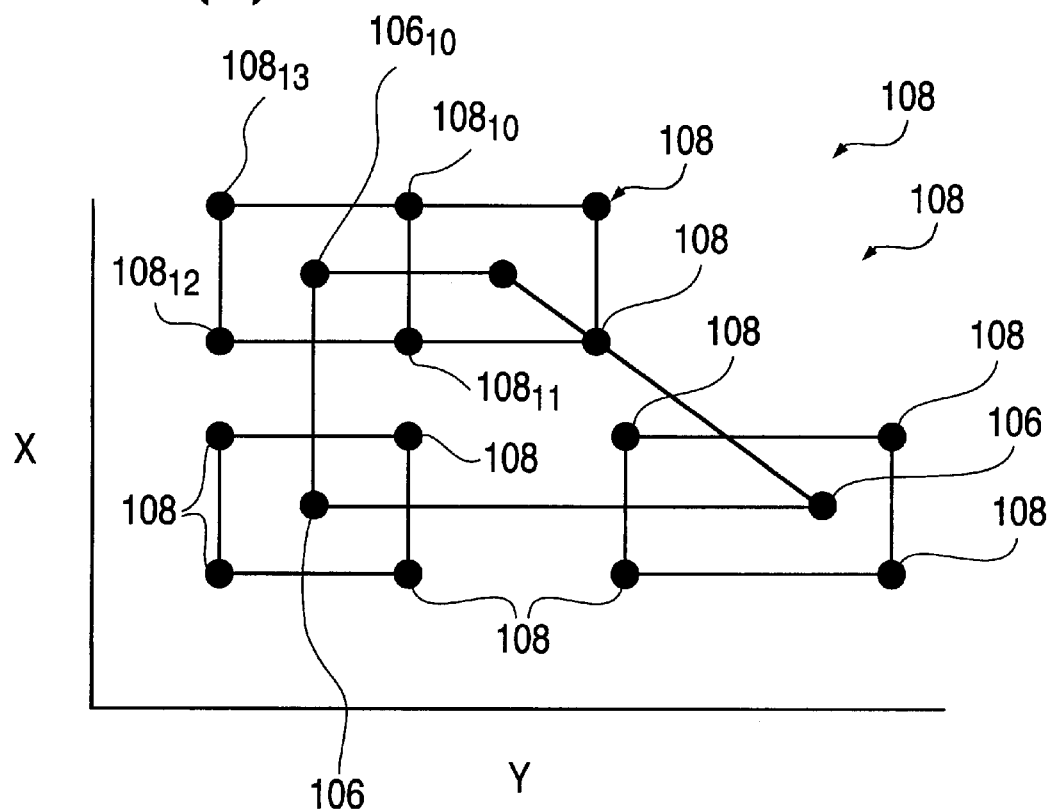

FIGS. 6(A), 6(B), and FIG. 6(C) show views of relationships between texels and pixels.

FIGS. 6(A) and 6(B) show a projection of 4 pixels $106_1$ through $106_4$ into a texture map 110 in S and T coordinates. As shown in FIGS. 6(A) and (B), each texel $108_1$ through $108_4$ corresponds to one of the quad of pixels $106_1$ and there is a maximum distance 1 between each of the texels $108_1$ through $108_4$ of 2 texels.

The projection of the quad of pixels $106_1$ through $106_4$ into the texture memory as shown in FIGS. 6(A) and (B) is the footprint of the pixels in texture memory. In the level of detail calculations of the present invention, the GL best or sharpest limit occurs if the texels are mapped at 90 degrees with respect to the pixels (shown in FIG. 6(B)), whereas the GL worst or blurriest limit is if the texels are mapped at 45 degrees with respect to the pixels (which is shown in FIG. 6(A)). The diagonal level of detail calculations of the present invention provide an image at least equivalent in clarity to the related art calculations of Max{mu,mv} when the pixels and texels line up or are at 90° to each other, and at least equivalent in clarity to the related art calculations of mu+mv when the pixels and texels are at 45° from each other. The diagonal level of detail calculations of the present invention provide a level of detail which is never greater than the maximum nor less than the minimum allowable level of detail for GL.

FIG. 6(C) shows a projection of 4 texels $108_{10}$ through $108_{13}$ surrounding a pixel $106_{10}$, in X and Y coordinates.

Figure 7:
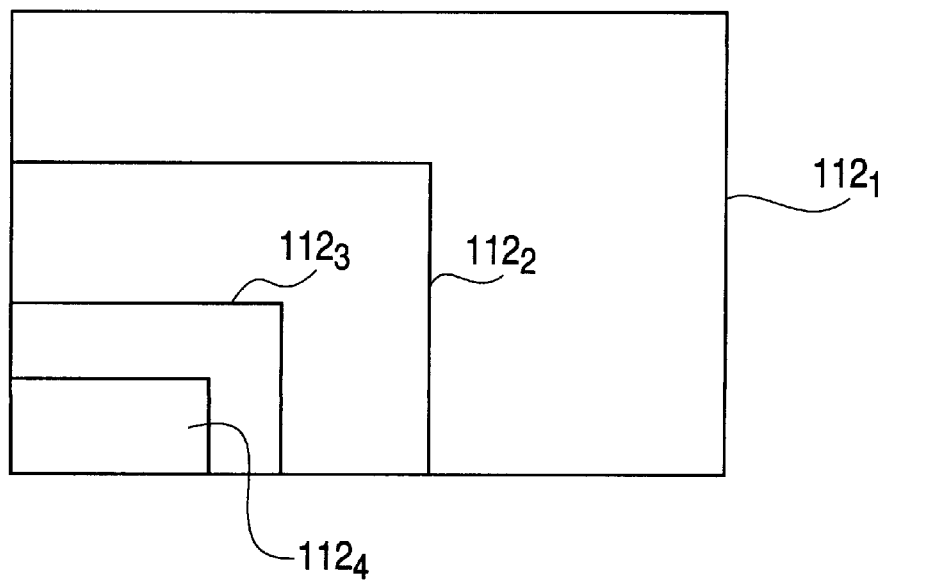
FIG. 7 is a diagram showing relationships between mipmapped images.

FIG. 7 shows examples of mipmap layers $112_1$ through $112_4$ corresponding to an image. The mipmap layer for display is selected using texture addressing by the s and t coordinates and the level of detail determined in accordance with the present invention. If mipmap layers (corresponding to level of detail) 1 ($112_4$) and 2 ($112_3$) exist, but the level of detail designates that a mipmap layer corresponding to 1.3 is to be displayed, then the mipmap layer is interpolated between layers 1 and 2, in which layer 2 is never aliased, but is blurry, but layer 1 is aliased. In accordance with the present invention, a bilinear interpolation (bilerp) level of detail is determined by, consistent with the above-mentioned example, taking 0.3 of the level 2 mipmap and 1-0.3 of the level 1 mipmap.

The level of detail determines which of the above-mentioned mipmaps in the pyramid of mipmaps to select, and the present invention redefines the level of detail calculation to virtually guarantee that all texels are within a 4×4 footprint for the 1-dimensional and the 2-dimensional cases.

The level of detail (LOD) determination in accordance with the present invention is now discussed with reference to FIG. 8.

Figure 8:
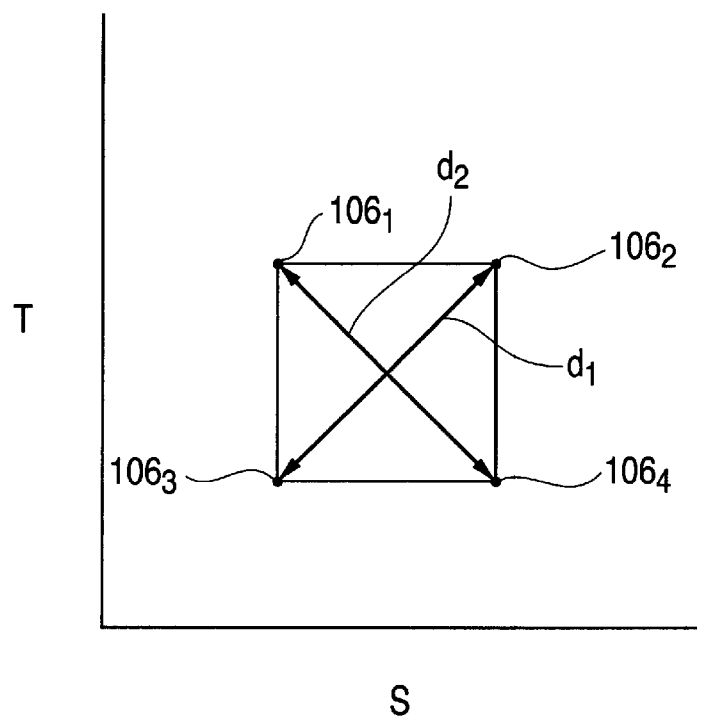
FIG. 8 is a diagram showing the principles of diagonal level of detail calculations of the present invention.

Four pixels $106_1$ through $106_4$ are shown in FIG. 8. The four pixels $106_1$ through $106_4$ are the quad of pixels delivered in 2 cycles of 2 pixels each cycle to the level of detail unit 66. The level of detail unit 66 determines the level of detail for the quad of pixels as follows. The diagonal distance d2 with respect to the quad of pixels and between pixels $106_1$ and $106_4$ is defined as X-Y. Likewise, the diagonal distance d1 with respect to the quad of pixels and between pixels $106_2$ and $106_3$ is defined as X+Y. The level of detail (LOD) calculated as in the present invention is:

$$LOD = \log_2(\max(|dS/dd1|, |dS/dd2|, |dT/dd1|, |dT/dd2|))$$

where $(\max(|dS/dd1|, |dS/dd2|, |dT/dd1|, |dT/dd2|))$ ranges between 0 (the clearest representation) and $\infty$ (the coarsest representation). In the present invention, then, the level of detail is determined by determining the $\log_2$ of the maximum distance in s and t coordinates along the diagonals d1 and d2 by taking the maximum absolute differential of the s and t values (corresponding to the quad of pixels input to the level of detail unit 66) along the diagonals d1 and d2. The level of detail of the present invention is shared and is the same for all four pixels in the quad of pixels transmitted to the level of detail unit 66.

Figure 9:
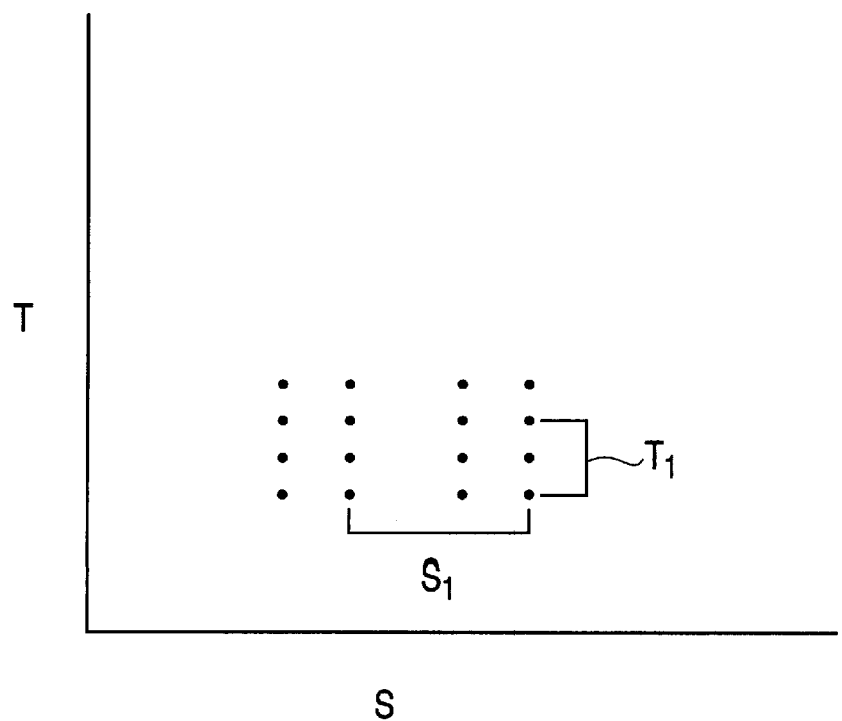
FIG. 9 is a diagram showing s and t coordinates used in the present invention.

As shown in FIG. 9, in determining the LOD consistent with the present invention, there is a distance of no more than 2 texels $S_1$ and $T_1$ between texels corresponding to the pixels shown in FIG. 8 and which cover a 4×4 region or a torroidal wrap thereof. Accordingly, the two least significant bits of each texel address directly select the 16 banks of texel memory described herein above, in the present invention.

Figure 10:
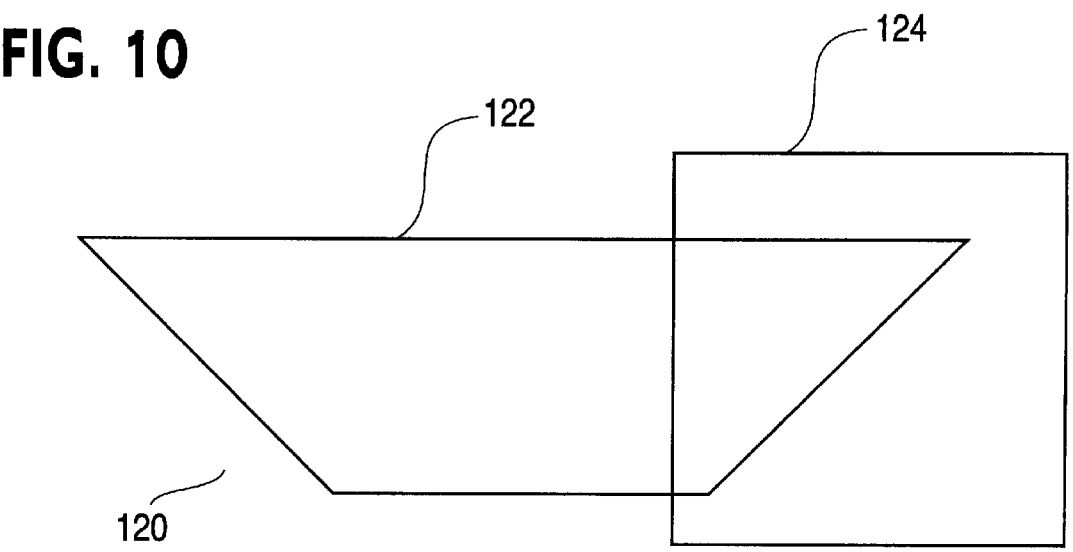
FIG. 10 is a diagram showing a footprint to which the present invention is applied.

One exception to providing texture for a corresponding footprint in accordance with the diagonal level of detail calculation as in the present invention occurs with reference to FIG. 10. As shown in FIG. 10, the footprint 120 comprises section 122 and section 124. While the texture within footprint 122 is determined in the present invention, the texture for the footprint 124 is left undetermined by the present invention, upon the first pass thereof, and is considered to be a texture cache miss because an address for data stored in the texture cache is not generated. Accordingly, the texel 124 outside of the 4×4 footprints are left undetermined and are passed to be recirculated until all required texels have been fetched. A detailed explanation of recirculation is provided in A Method for Efficient Handling of Texture Cache Misses by Recirculation.

Figure 11:
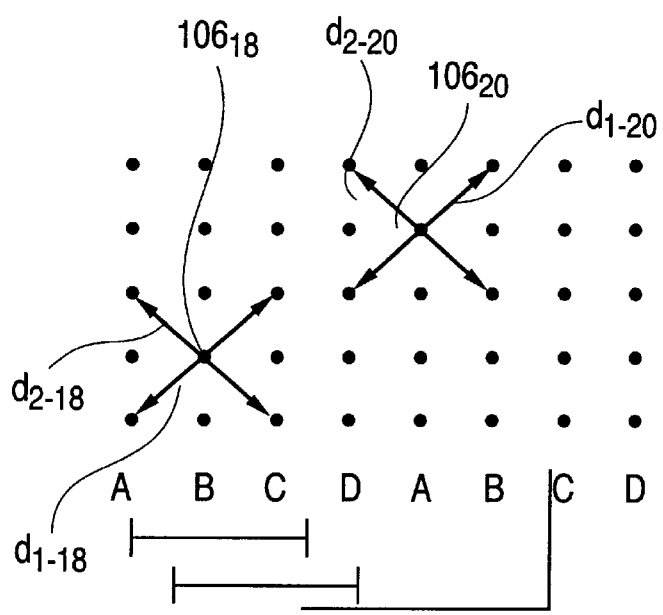
FIG. 11 is a diagram showing diagonal level of detail calculations for 2 texels in the present invention.

FIG. 11 is a diagram of diagonal level of detail calculations of the present invention for texel values $106_{18}$ and $106_{20}$ located in texture memory. As shown in FIG. 11, texels values $106_{18}$ and $106_{20}$ are selected, for example, respectively by s and t coordinates provided to the level of detail unit 66 of FIG. 7. Then, the level of detail is determined for each of texel values $106_{18}$ and $106_{20}$ along the respective diagonals $d_{1\text{-}8}$ and $d_{2\text{-}18}$ for texel $106_{18}$ and $d_{1\text{-}20}$ and $d_{2\text{-}20}$ for texel $106_{20}$, in accordance with the features of the present invention explained herein above. Each diagonal level of detail calculation is made using texels which are no more than 2 texels in the s direction and 2 texels in the t direction from either of the selected texels $106_{18}$ and $106_{20}$. In accordance with the diagonal level of detail calculation of the present invention, then, the level of detail of the present invention is determined based upon a 4×4 region or torroidal wrap thereof of the texel values.

Figure 12:
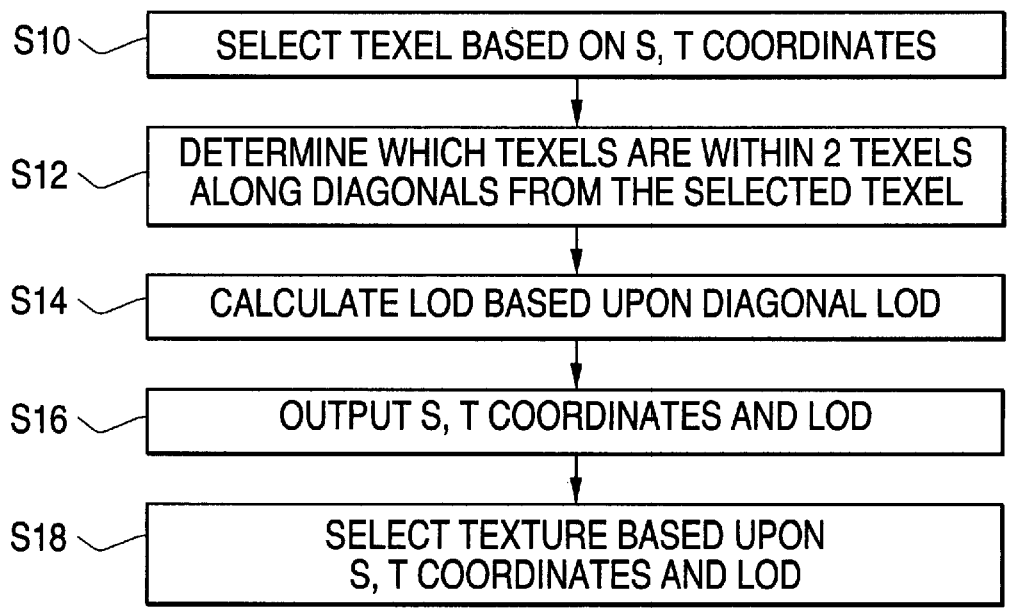
FIG. 12 is a flowchart of selecting a texture based using diagonal level of detail calculations of the present invention.

FIG. 12 is a flowchart showing the steps in determining a texture based upon s and t coordinates, and the level of detail calculation made in accordance with the present invention. As shown in step S10 of FIG. 12, the texel is selected based upon input s and t coordinates. Next, as shown in step S12, the texels within 2 texels in either the s direction and 2 texels in the t direction from the selected texel are determined. In step S14, the diagonal level of detail is calculated in accordance with the present invention. In step S16, the s and t coordinates are output unchanged, and the level of detail associated with the s and t coordinates is output. An address into the texture cache 74 of FIG. 5 is then formed based upon the s and t coordinates and the level of detail calculated as in the present invention.

Figure 13:
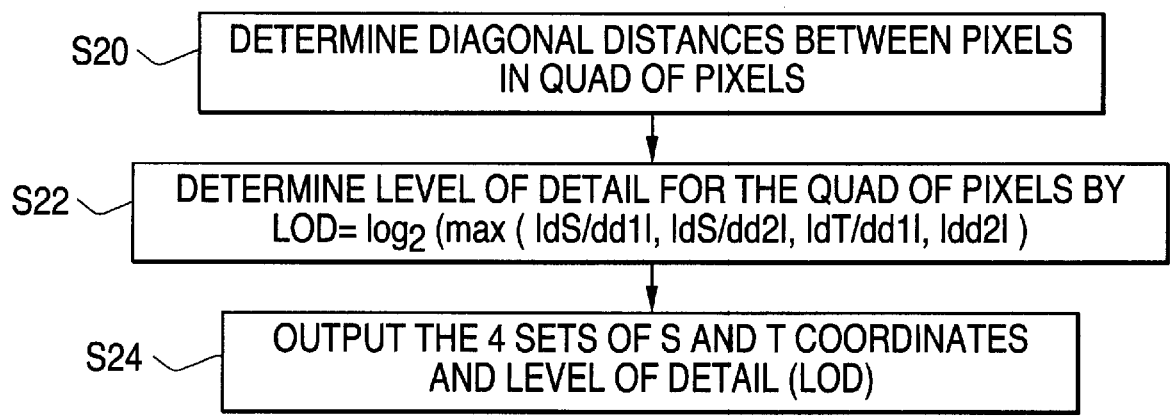
FIG. 13 shows the diagonal level of detail calculation of the present invention for a quad of pixels.

FIG. 13 shows the diagonal level of detail calculation of the present invention for the quad of pixels 106 shown in FIG. 8. In step S20, the diagonal distance d2 between pixels $106_1$ and $106_4$ is determined, and the diagonal distance d1 between pixels $106_2$ and $106_3$ is determined. Then, in step S22 the level of detail for the quad of pixels is determined using the 4 sets of s and t coordinates for the quad of pixels as:

$$LOD = \log_2(\max(|dS/dd1|, |dS/dd2|, |dT/dd1|, |dT/dd2|))$$

where $(\max(|dS/dd1|, |dS/dd2|, |dT/dd1|, |dT/dd2|))$ ranges between 0 (the clearest representation) and $\infty$ (the coarsest representation). Accordingly, in step S24, the 4 sets of s and t coordinates, along with the corresponding LOD value, are output by the level of detail unit 66 to the texture address unit 68.

An example of code fragments from a C language simulator on which a prototype of the diagonal level of detail determination of the present invention is made is:

```
Diagonal LOD:
                /* generate rho (lambda = log(rho)) */
                rho = max((max(abs((ss[0][0] – ss[1][1])),
                    abs((ss[0][1] – ss[1][0])) * tex-
>level[0].width2f),
                (max(abs((tt[0][0] – tt[1][1])),
                    abs((tt[0][1] – tt[1][0]))) * tex-
>level[0].height2f));
```

The above-mentioned s and t values are the integer part of the texture coordinates from the attribute token pipeline 82 and provided to the level of detail unit 66 by the texture bilerps 62 (by way of the address reformatter 64), and the tex→level[0].width2f and tex→level[0].height2f are constants which are functions of the width and height, respectively, provided by the attribute tag pipeline 84 from the data structure when the texture is bound.

The diagonal level of detail calculation of present invention could be executed by dedicated hardware logic within the level of detail unit 66 or by a processor executing software. The preferred embodiment is to execute the diagonal level of detail calculation of the present invention using dedicated hardware consistent with the logic set forth in the above-mentioned software from the C-language simulator. Such hardware is shown in FIG. 14.

Figure 14:
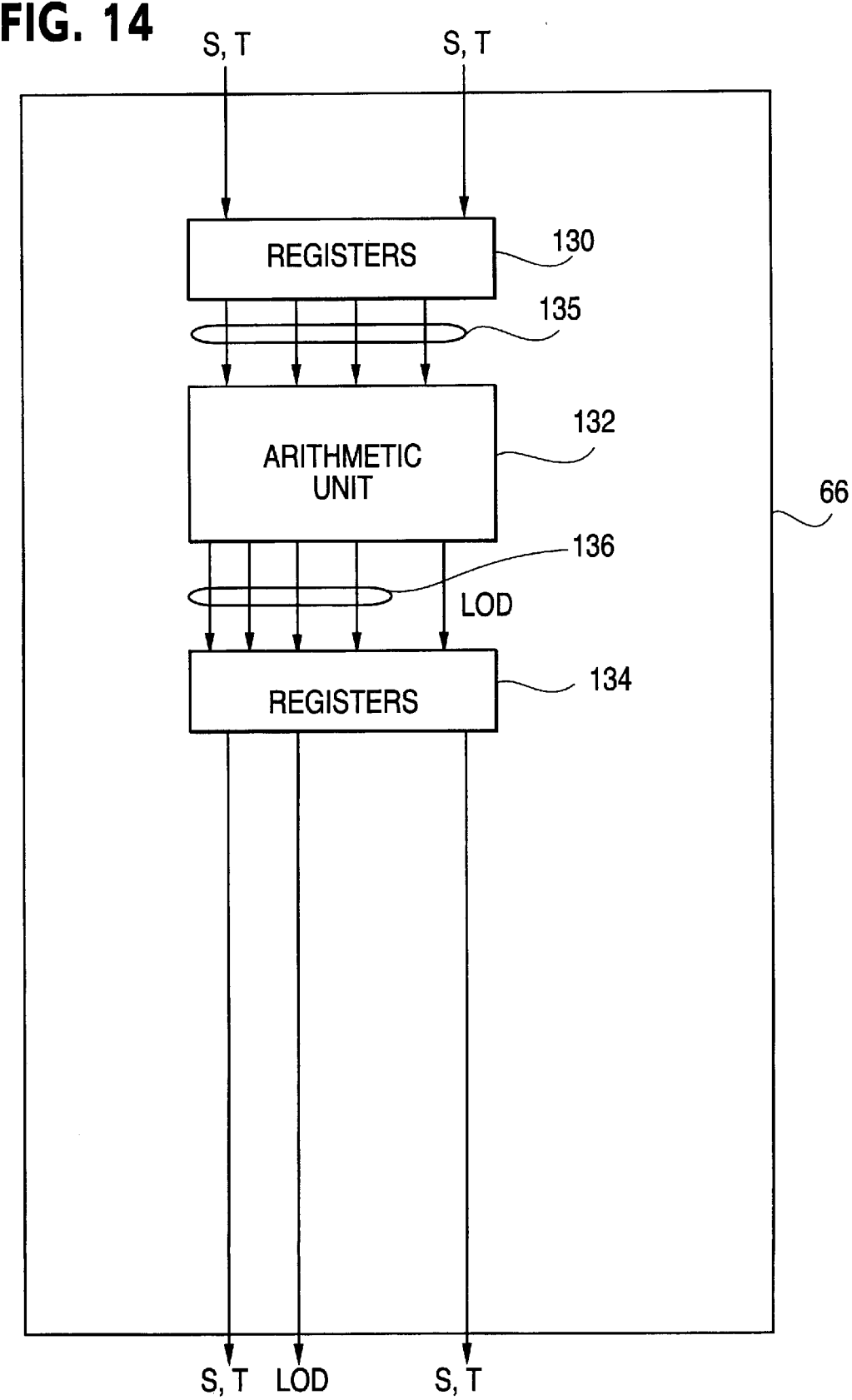
FIG. 14 is a detailed diagram of the level of detail unit of the present invention.

As shown in FIG. 14, each of the 4 sets of s and t coordinates for the pixel quads are received in 2 cycles of 2 sets each cycle and stored in registers 130. Then, all 4 sets of s and t coordinates are output along bus 135 to arithmetic unit 132, which performs the above-mentioned LOD calculation of determining the $\log_2$ of the maximum absolute diagonal difference between the s and t coordinates, consistent with $LOD = \log_2(\max(|dS/dd1|,|dS/dd2|,|dT/dd1|,|dT/dd2|))$. The arithmetic unit 132 includes conventional logic circuits implementing the above-mentioned LOD equation, and is a hardwired embodiment of the above-mentioned C-language simulator code.

As shown in FIG. 14, the four sets of s and t coordinates are output along bus 136 to registers 134, along with the LOD value. The 4 sets of s and t coordinates are then output in 2 cycles 2 s and t coordinates each cycle, consistent with the input thereof to level of detail unit 66.

A benefit of the features of the present invention is that the 2 least significant bits of each texel address can directly select any of the 16 banks of memory of the texture cache 74. Another benefit of the features of the present invention the present invention is implemented in dedicated hardware, increasing the speed of determining the level of detail. A further benefit of the features of the present invention is that the extent of the footprint in memory is limited, which reduces the amount of memory needed and increases the efficiency thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for determining a level of detail value in a graphics system providing S and T coordinates of texels corresponding to a 2×2 quad of pixels, comprising:
   determining by the graphics system the level of detail value by calculating $\log_2$ of the maximum absolute difference in the S and T coordinates between values of texture coordinates of pixels located diagonally adjacent within the quad of pixels.

2. The method of claim 1, wherein the level of detail value calculation for a quad of pixels limits the texels needed for each level of detail bilinearly interpolated to be within a 4×4 footprint of texels projected into a texture memory.

3. The method of claim 2, wherein level of detail value is used to access the texture memory.

4. The method of claim 3, wherein if a texel corresponding to a texture address provided to the texture cache is not stored in the texture cache, a cache miss is generated.

5. The method of claim 1, wherein the texture value is determined by interpolating between 2 bilinearly interpolated levels of detail without aliasing.

6. The method of claim 1, wherein the S and T coordinates are provided in parallel in sets of 2.

7. A method of determining texture to be applied to an image being rasterized by a graphics system, said method comprising:
   determining by the graphics system pixel values for displaying the image;
   determining by the graphics system S and T coordinates of a texel corresponding to a quad of pixels;
   determining a level of detail by calculating the $\log_2$ of the maximum absolute difference in the S and T coordinates between values of texture coordinates of pixels located diagonally adjacent within a 2×2 quad of pixels; and
   determining by the graphics system 2 integer levels of detail surrounding the diagonal level of detail, each of the 2 integer levels of detail within a 4×4 footprint of the texels projected into a texture memory.

8. The method of claim 7, wherein the level of detail value is used to access the texture cache.

9. The method of claim 7, wherein the texture value is determined by interpolating between 2 bilinearly interpolated levels of detail without aliasing.

10. The method of claim 8, wherein the S and T coordinates are provided for determining the level of detail in parallel in sets of 2.

11. A graphics apparatus receiving vertices and generating pixels from the vertices, said apparatus comprising:
    a texture unit determining texture coordinates and calculating a level of detail value by calculating $\log_2$ of the maximum absolute difference in S and T coordinates between texture coordinates corresponding to pixels located diagonally adjacent to each other within a 2×2 quad of pixels.

12. The apparatus according to claim 11, wherein the texture unit comprises:
    a level of detail unit calculating the level of detail value,
    a texture cache storing texels, and
    a texture address unit determining an address of one to eight texels per pixel based upon the texture coordinates and the level of detail value.

13. The apparatus according to claim 12, wherein the least significant bits of the address select one of 16 banks of memory of the texture cache.

14. The apparatus of claim 11, wherein the texture value is determined by interpolating between 2 bilinearly interpolated levels of detail without aliasing.

15. The apparatus of claim 11, wherein the texture coordinates are provided for determining the level of detail in parallel in sets of 2.

16. A graphics apparatus producing a quad of pixels and determining a level of detail value, said apparatus comprising:
a rasterizer producing the quad of pixels; and
means for determining the level of detail value by calculating the $\log_2$ of the maximum absolute difference in S and T coordinates between values of texture coordinates corresponding to pixels located diagonally adjacent to each other within the quad of the pixels.

17. The apparatus according to claim 16, wherein the means for determining the level of detail comprises:
a level of detail unit calculating the level of detail value,
a texture cache storing the texels, and
a texture address unit determining an address of one to eight texels per pixel based upon the texture coordinates and the level of detail value.

18. The apparatus according to claim 17, wherein the least significant bits of the address select one of 16 banks of memory of the texture cache.

19. The apparatus of claim 16, wherein the texel value is determined by interpolating between 2 levels of detail without aliasing.

20. The apparatus of claim 11, wherein the texture coordinates are provided for determining the level of detail in parallel in sets of 2.

21. A computer readable medium for controlling a computer to execute a process for determining a level of detail value in a graphics system providing S and T coordinates of texels corresponding to a 2×2 quad of pixels, comprising:
determining by the graphics system the level of detail value by calculating $\log_2$ of the maximum absolute difference in S and T coordinates between values of texture coordinates of pixels located diagonally adjacent within the quad of pixels.

22. The computer readable medium of claim 21, wherein the level of detail value calculation for a quad of pixels limits the texels needed for each level of detail bilinearly interpolated to be within a 4×4 footprint of texels projected into a texture memory.

23. The computer readable medium of claim 22, wherein level of detail value is used to access the texture memory.

24. The computer readable medium of claim 21, wherein the texture value is determined by interpolating between 2 bilinearly interpolated levels of detail without aliasing.

25. The computer readable medium of claim 21, wherein the texture value is determined by interpolating between 2 bilinearly interpolated levels of detail without aliasing.

26. The computer readable medium of claim 21, wherein the S and T coordinates are provided in parallel in sets of 2.

27. A computer readable medium for controlling a computer to execute a process for determining texture to be applied to an image being rasterized by a graphics system, comprising:
determining by the graphics system pixel values for displaying the image;
determining by the graphics system S and T coordinates of a texel corresponding to a quad of pixels;
determining a level of detail by calculating the $\log_2$ of the maximum absolute difference in S and T coordinates between values of texture coordinates of pixels located diagonally adjacent within a 2×2 quad of pixels; and
determining by the graphics system 2 integer levels of detail surrounding the diagonal level of detail, each of the 2 integer levels of detail within a 4×4 footprint of the texels projected into a texture memory.

28. The computer readable medium of claim 27, wherein the level of detail value is used to access the texture cache.

29. The computer readable medium of claim 25, wherein the S and T coordinates are provided for determining the level of detail in parallel in sets of 2.

30. The computer readable medium of claim 23, wherein if a texel corresponding to a texture address provided to the texture cache is not stored in the texture cache, a cache miss is generated.

31. A method for determining a level of detail value in a graphics system providing S and T coordinates of texels corresponding to a 2×2 quad of pixels, comprising:
determining by the graphics system the level of detail value by calculating $\log_2$ of the maximum absolute difference between values of texture coordinates of pixels located diagonally adjacent within the quad of pixels, wherein the pixels have X and Y coordinates, and the graphics system determines the level of detail (LOD) value by calculating $\log_2$ of the maximum absolute difference in the S and T coordinates between the values of the texture coordinates of the pixels located diagonally adjacent within the quad of pixels by:
$LOD = \log_2(\max(|dS/dd1|, |dS/dd2|, |dT/dd1|, |dT/dd2|)$, $d2 = X-Y$, $d1 = X+Y$, and $(\max(|dS/dd1|, |dS/dd2|, |dT/dd1|, |dT/dd2|))$ ranges between 0 and $\infty$.

32. A method of determining texture to be applied to an image being rasterized by a graphics system, said method comprising:
determining by the graphics system pixel values for displaying the image;
determining by the graphics system S and T coordinates of a texel corresponding to a quad of pixels;
determining a level of detail by calculating the $\log_2$ of the maximum absolute difference between values of texture coordinates of pixels located diagonally adjacent within a 2×2 quad of pixels; and
determining by the graphics system 2 integer levels of detail surrounding the diagonal level of detail, each of the 2 integer levels of detail within a 4×4 footprint of the texels projected into a texture memory, wherein the pixel values have X and Y coordinates, and wherein the level of detail (LOD) is determined by calculating the $\log_2$ of the maximum absolute difference in the s and t coordinates between the values of the texture coordinates of the pixels located diagonally adjacent within the 2×2 quad of pixels by:
$LOD = \log_2(\max(|dS/dd1|, |dS/dd2|, |dT/dd1|, |dT/dd2|))$, $d2 = X-Y$, $d1 = X+Y$, and $(\max(|dS/dd1|, |dS/dd2|, |dT/dd1|, |dT/dd2|))$ ranges between 0 and $\infty$.

33. A graphics apparatus receiving vertices and generating pixels from the vertices, said apparatus comprising:
a texture unit determining texture coordinates and calculating a level of detail value by calculating $\log_2$ of the maximum absolute difference between texture coordinates corresponding to pixels located diagonally adjacent to each other within a 2×2 quad of pixels, wherein the level of detail (LOD) value is determined by calculating the $\log_2$ of the maximum absolute difference between texture coordinates corresponding to the pixels and located diagonally adjacent to each other within the 2×2 quad of pixels by:
$LOD = \log_2(\max(|dS/dd1|, |dS/dd2|, |dT/dd1|, |dT/dd2|))$, $d2 = X-Y$, $d1 = X+Y$, and $(\max(|dS/dd1|, |dS/dd2|, |dT/$ dd1|,|dT/dd2|) ranges between 0 and ∞, wherein S and T are the texture coordinates, and X and Y are the pixel coordinates.

34. A graphics apparatus producing a quad of pixels and determining a level of detail value, said apparatus comprising:

a rasterizer producing the quad of pixels; and means for determining the level of detail value by calculating the $\log_2$ of the maximum absolute difference between values of texture coordinates corresponding to pixels located diagonally adjacent to each other within the quad of the pixels, wherein the level of detail (LOD) value is determined by calculating the $\log_2$ of the maximum absolute difference in S and T coordinates between the values of the texture coordinates corresponding to the pixels having X and Y coordinates and located diagonally adjacent to each other within the quad of the pixels by:

LOD=$\log_2$(max(|dS/dd1|,|dS/dd2|,|dT/dd1|,|dT/dd2|), d2=X-Y, d1=X+Y, and (max(|dS/dd1|,|dS/dd2|,|dT/dd1|,|dT/dd2|) ranges between 0 and ∞.

35. A computer readable medium for controlling a computer to execute a process for determining a level of detail value in a graphics system providing S and T coordinates of texels corresponding to a 2×2 quad of pixels, comprising:

determining by the graphics system the level of detail value by calculating $\log_2$ of the maximum absolute difference between values of texture coordinates of pixels located diagonally adjacent within the quad of pixels, wherein the pixels have X and Y coordinates, and the graphics system determines the level of detail (LOD) value by calculating $\log_2$ of the maximum absolute difference in the S and T coordinates between the values of the texture coordinates of the pixels located diagonally adjacent within the quad of pixels by:

LOD=$\log_2$(max(|dS/dd1|,|dS/dd2|,|dT/dd1|,|dT/dd2|), d2=X-Y, d1=X+Y, and (max(|dS/dd1|,|dS/dd2|,|dT/dd1|,|dT/dd2|) ranges between 0 and ∞.

36. A computer readable medium for controlling a computer to execute a process for determining texture to be applied to an image being rasterized by a graphic system, comprising:

determining by the graphics system pixel values for displaying the image;

determining by the graphics system S and T coordinates of a texel corresponding to a quad of pixels;

determining a level of detail by calculating the $\log_2$ of the maximum absolute difference between values of texture coordinates of pixels located diagonally adjacent within a 2×2 quad of pixels; and determining by the graphics system 2 integer levels of detail surrounding the diagonal level of detail, each of the 2 integer levels of detail within a 4×4 footprint of the texels projected into a texture memory, wherein the pixel values have X and Y coordinates, and wherein the level of detail (LOD) is determined by calculating the $\log_2$ of the maximum absolute difference in the s and t coordinates between the values of the texture coordinates of the pixels located diagonally adjacent within the 2×2 quad of pixels by:

LOD=$\log_2$(max(|dS/dd1|,|dS/dd2|,|dT/dd1|,|dT/dd2|, d2=X-Y, d1=X+Y, and (max(|dS/dd1|,|dS/dd2|,|dT/dd1|,|dT/dd2|) ranges between 0 and ∞.

* * * * *

UNITED STATES PATENT AND TRADEMARK OFFICE
CERTIFICATE OF CORRECTION

PATENT NO.   : 6,232,981 B1
DATED        : May 15, 2001
INVENTOR(S)  : Carroll Philip Gossett It is certified that error appears in the above-identified patent and that said Letters Patent is hereby corrected as shown below:

Title page,
"OTHER PUBLICATIONS", change "8,956,537" to -- 08/956,537 --; change "9,048,024" to -- 09/048,024 --; change "9,048,099" to -- 09/048,099 --.

Column 6,
Line 67, change "viewpoisnt" to -- viewpoint --;

Column 18,
Line 44, change "8" to -- 7 --;

Column 19,
Line 26, change "11" to -- 16 --;

Column 20,
Line 26, insert -- ) -- before the last ",";
Line 67, "(max.." should begin a new line.

Signed and Sealed this

Fourteenth Day of May, 2002

Attest:

JAMES E. ROGAN
Attesting Officer    Director of the United States Patent and Trademark Office